United States Patent
Ehrke et al.

(10) Patent No.: US 12,173,817 B2
(45) Date of Patent: Dec. 24, 2024

(54) THREADED COUPLING ASSEMBLIES FOR INTERCONNECTING FLUID-CARRYING CONDUITS

(71) Applicant: Parker-Hannifin Corporation, Cleveland, OH (US)

(72) Inventors: Dieter Ehrke, Bielefeld (DE); Oliver Neiske, Verl (DE); Thomas G. Johnson, Fort Worth, TX (US); Jonathan M. Golightly, Fort Worth, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 474 days.

(21) Appl. No.: 17/609,676

(22) PCT Filed: May 28, 2020

(86) PCT No.: PCT/US2020/034836
§ 371 (c)(1),
(2) Date: Nov. 8, 2021

(87) PCT Pub. No.: WO2020/251770
PCT Pub. Date: Dec. 17, 2020

(65) Prior Publication Data
US 2022/0307630 A1     Sep. 29, 2022

Related U.S. Application Data

(60) Provisional application No. 62/861,102, filed on Jun. 13, 2019.

(51) Int. Cl.
*F16L 19/025* (2006.01)
*F16L 19/02* (2006.01)

(52) U.S. Cl.
CPC ......... *F16L 19/0225* (2013.01); *F16L 19/025* (2013.01); *F16L 2201/10* (2013.01)

(58) Field of Classification Search
CPC .... F16L 19/022; F16L 19/025; F16L 19/0225
See application file for complete search history.

(56) References Cited

U.S. PATENT DOCUMENTS

| | | |
|---|---|---|
| 4,919,455 A | 4/1990 | Yoshiro |
| 5,280,967 A | 1/1994 | Varrin, Jr. |

(Continued)

FOREIGN PATENT DOCUMENTS

| | | | | |
|---|---|---|---|---|
| CH | 702794 A1 | * | 9/2011 | ............ F16L 19/086 |
| EP | 1536175 A2 | * | 6/2005 | .............. F16L 19/00 |

(Continued)

OTHER PUBLICATIONS

International Search Report and Written Opinion mailed Aug. 11, 2020 in corresponding International Application No. PCT/US2020/034836.

(Continued)

*Primary Examiner* — Zachary T Dragicevich
*Assistant Examiner* — James A Linford
(74) *Attorney, Agent, or Firm* — Renner, Otto, Boisselle Sklar, LLP

(57) ABSTRACT

A threaded coupling assembly include a union (12), a tube end (14), and a coupling nut (16). A pair of telescoping indicator rings (30, 32), a radially outer ring and a radially inner ring, are respectively connected to the union and the nut. The inner ring has a first visual characteristic contrasting with a second visual characteristic of the inner ring. The outer ring has a third visual characteristic contrasting with the second visual characteristic of the inner ring. The first visual characteristic is aligned with and viewable through the window (60) of the outer ring when the threaded (Continued)

coupling assembly is in the fully assembled state, and the first visual characteristic is out of alignment with the window when the threaded coupling assembly is not in the fully assembled state. The assembly may utilize tapered threads and have one or more features for self-alignment and/or sealability.

19 Claims, 16 Drawing Sheets

(56) References Cited

U.S. PATENT DOCUMENTS

| | | | |
|---|---|---|---|
| 9,714,732 | B2 | 7/2017 | Neiske |
| 9,939,095 | B2 | 4/2018 | Campbell et al. |
| 2002/0148128 | A1 | 10/2002 | Williams |
| 2005/0140140 | A1 | 6/2005 | Robison |
| 2014/0152001 | A1 | 6/2014 | Schippers et al. |
| 2017/0268706 | A1 | 9/2017 | Schippers et al. |
| 2018/0356015 | A1* | 12/2018 | Jahnke ............... B25B 13/5091 |
| 2019/0107231 | A1* | 4/2019 | Cantrell ............. F16L 19/0206 |
| 2021/0131590 | A1* | 5/2021 | Coello ................. F16B 31/02 |

FOREIGN PATENT DOCUMENTS

| | | | |
|---|---|---|---|
| EP | 2333299 | A1 | 6/2011 |
| FR | 1059317 | A * | 3/1954 |
| GB | 779007 | A * | 7/1957 |
| KR | 20090096054 | A | 9/2009 |
| NL | 105662 | C | 8/1963 |
| WO | 2001020214 | A1 | 3/2001 |
| WO | 2012131049 | A1 | 10/2012 |

OTHER PUBLICATIONS

International Written Opinion mailed May 27, 2021 in corresponding International Application No. PCT/US2020/034836.

Jèrome Quenescourt, "FAST Airbus Technical Digest," Airbus Industrie, No. 22, Mar. 1998, pp. 1-34.

"Stratoflex 124 PTFE Medium Pressure House Products for the Aerospace Industry," Catalog 106-124, Stratoflex Products Division, Parker-Hannifin Corporation, Jan. 2005, pp. 1-31.

"EO-3—A World First" Parker-Hannifin Corporation, EO-3 catalogue 4132/UK, May 2013.

"Dynatube Fittings for the Aerospace Industry," Stratoflex Products Division, Parker-Hannifin Corporation, 2007, pp. 1-24, 2007.

International Preliminary Report on Patentability issued for International Application No. PCT/US2020/034836, mailed Oct. 4, 2021.

* cited by examiner

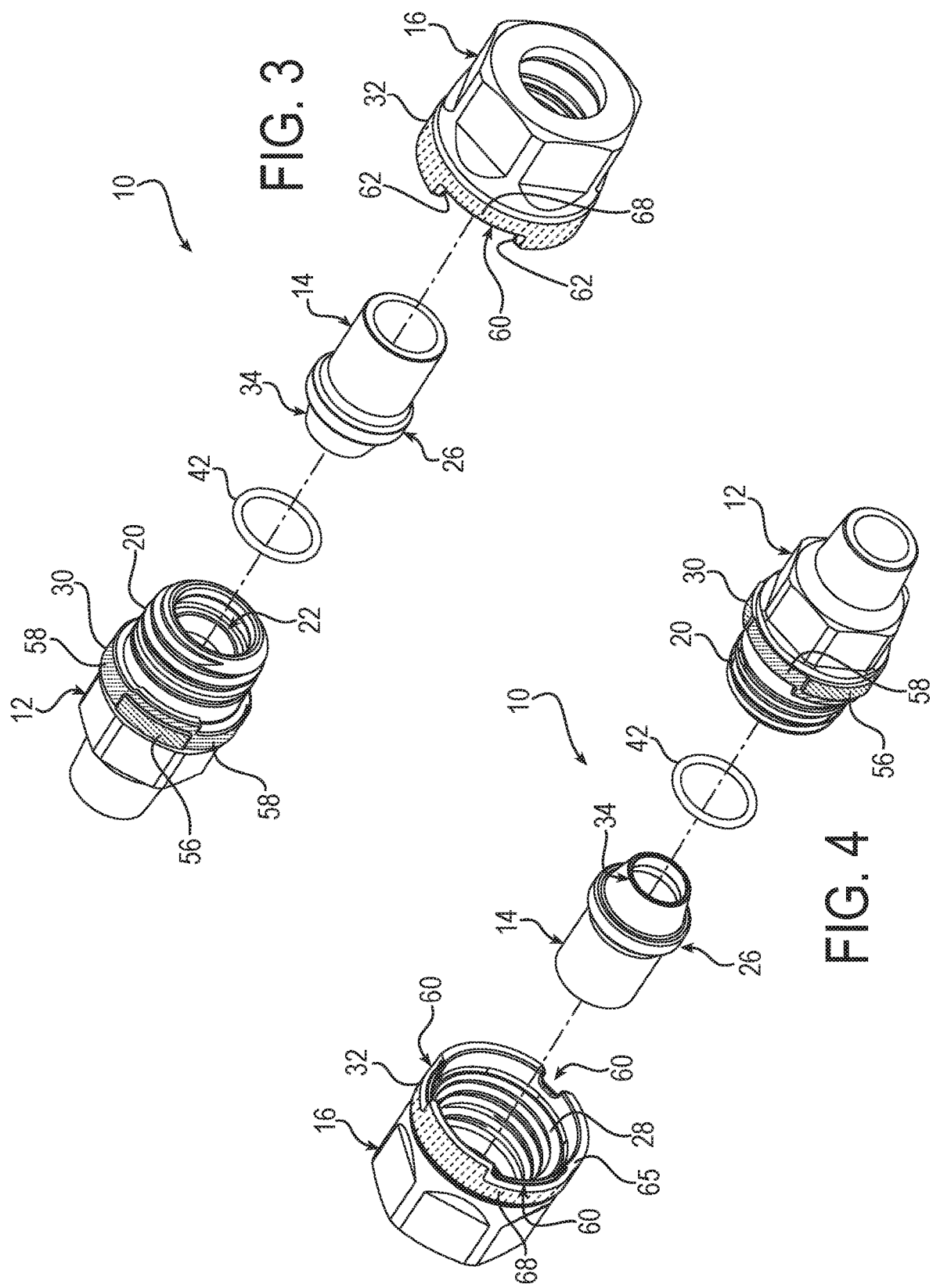

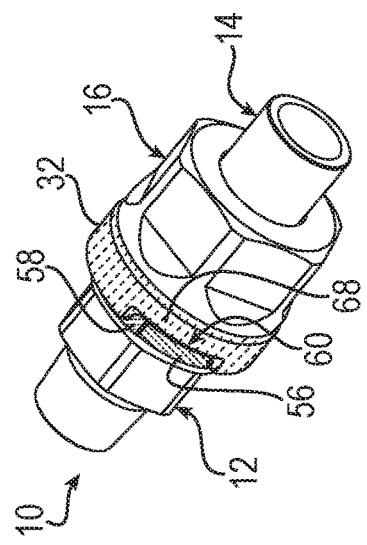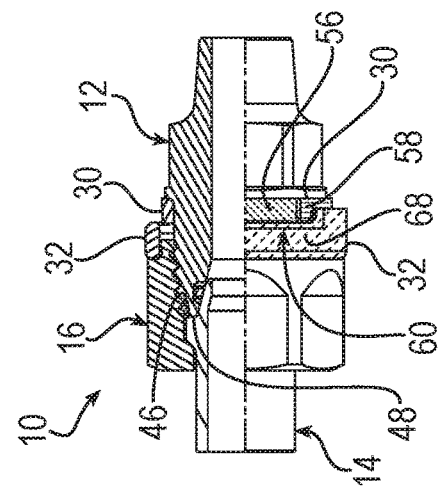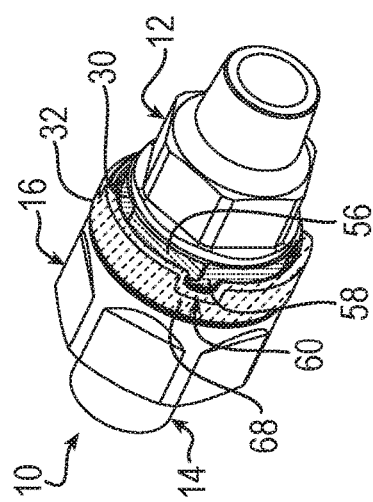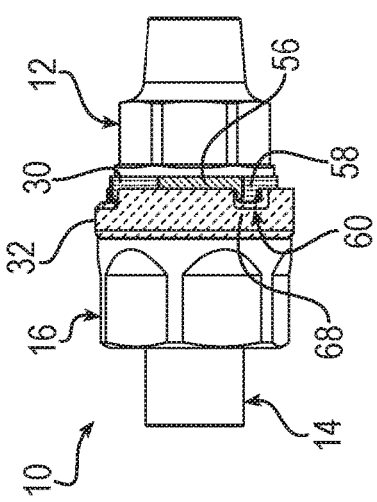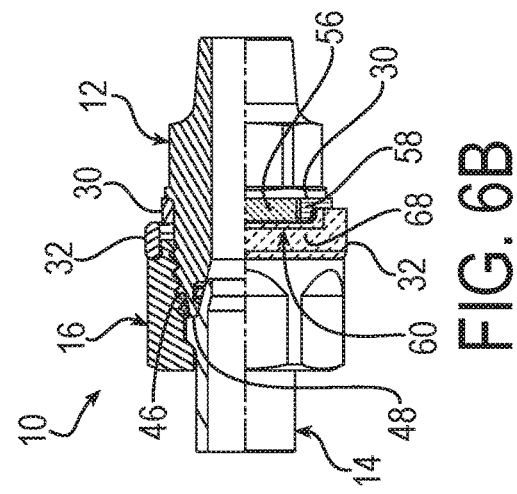

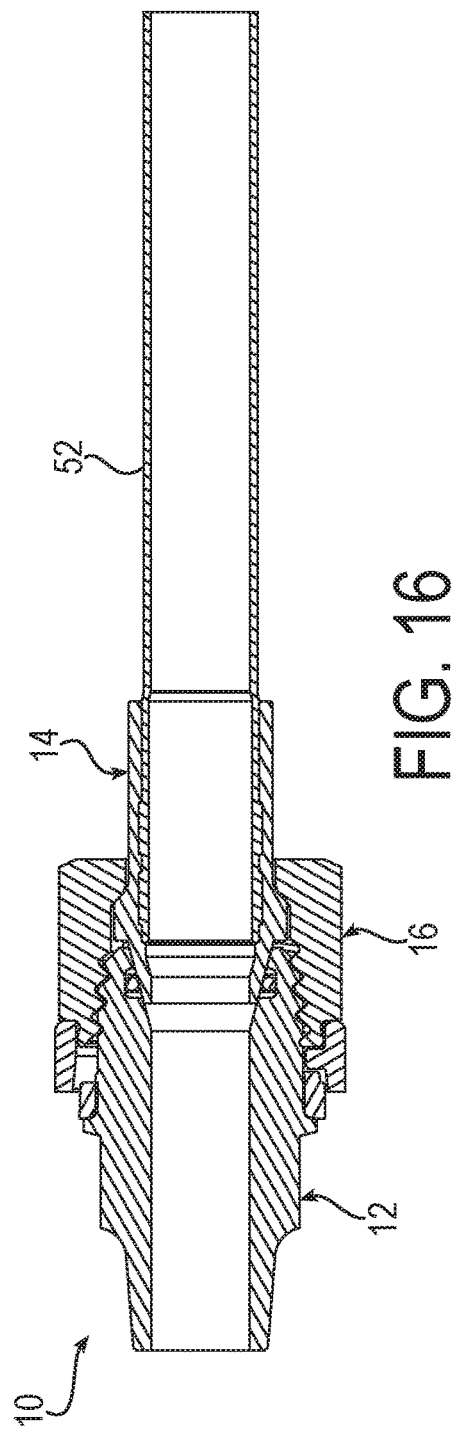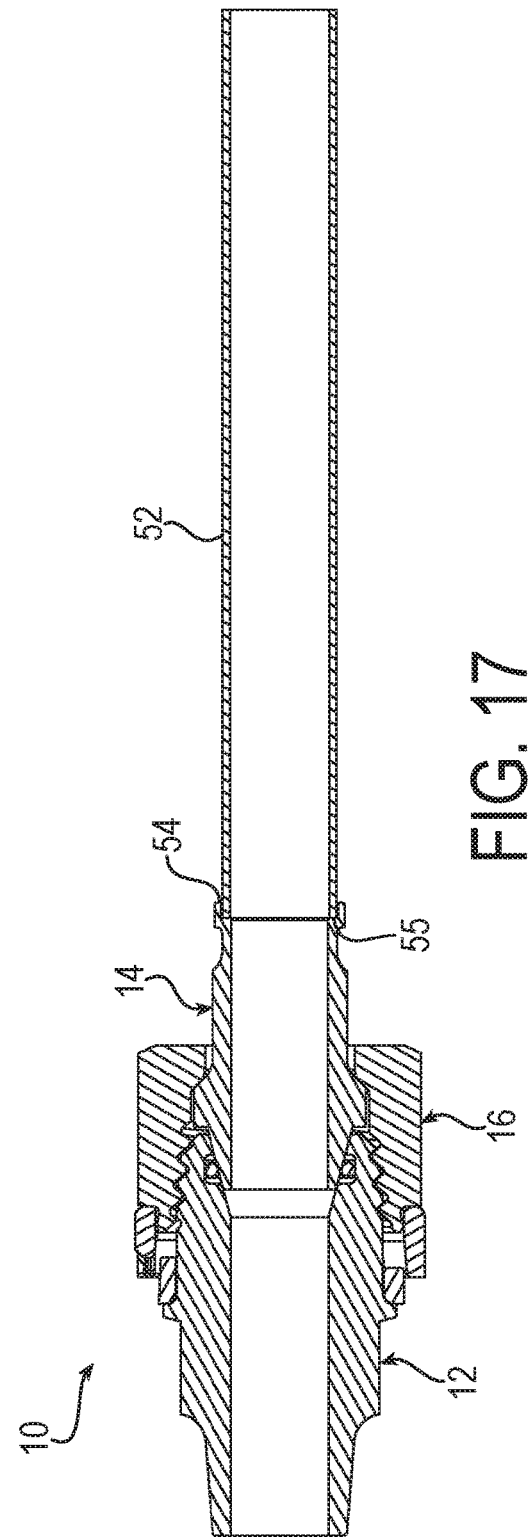

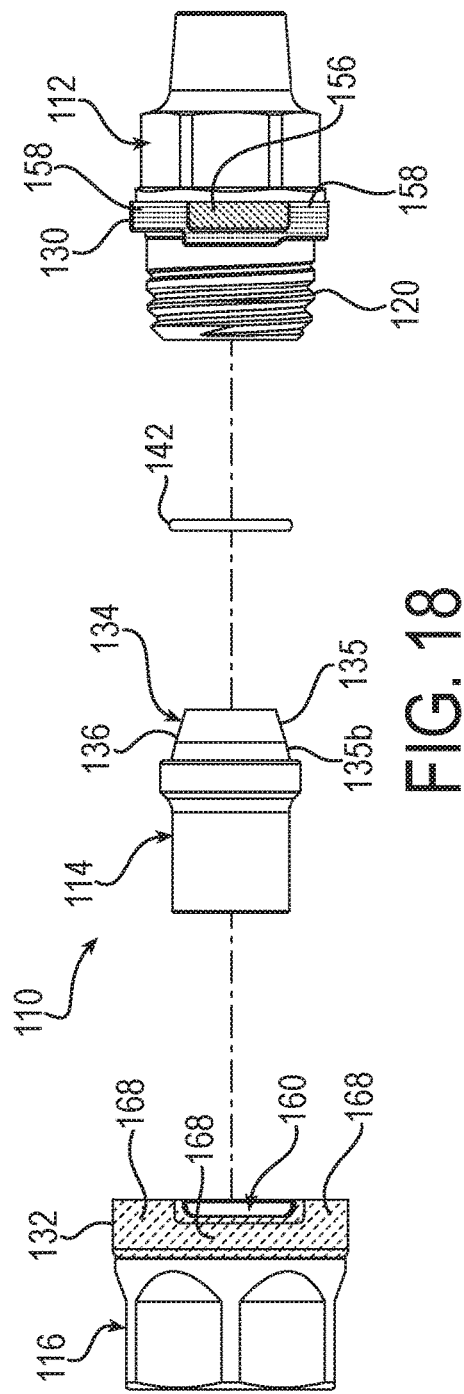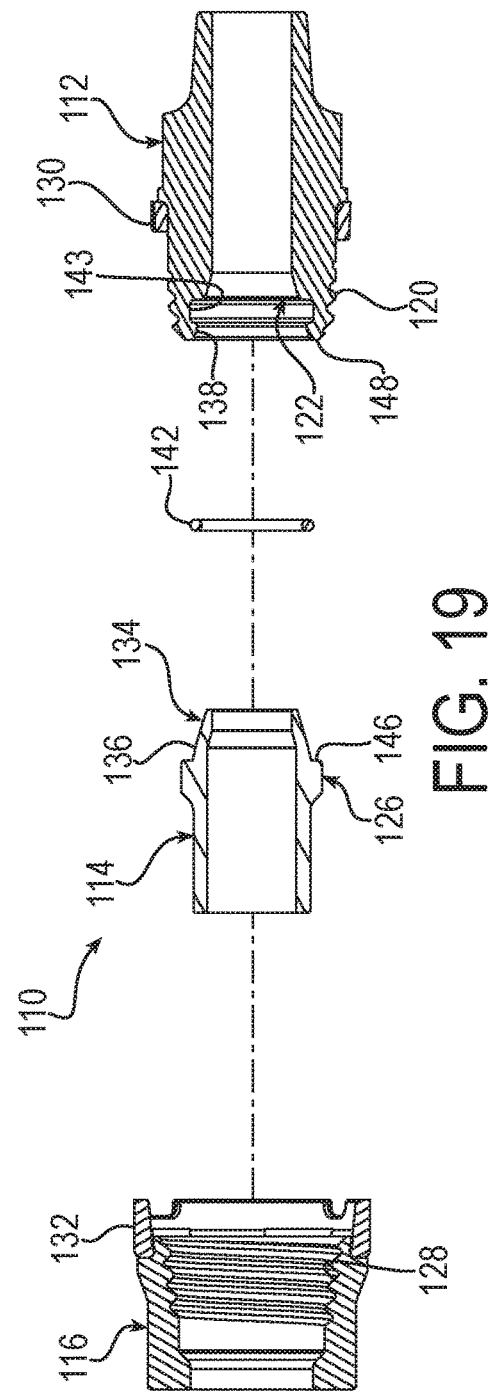

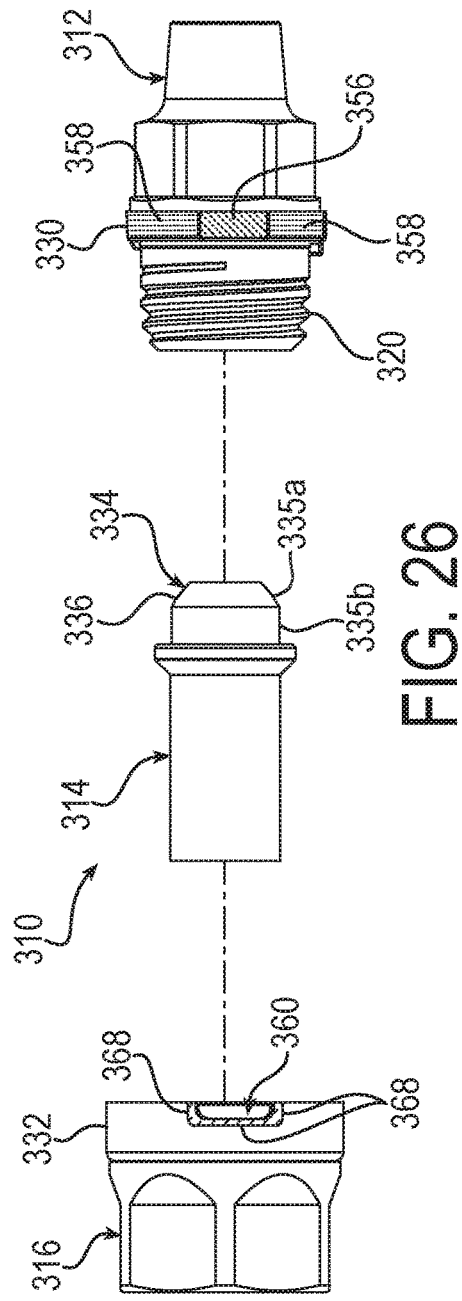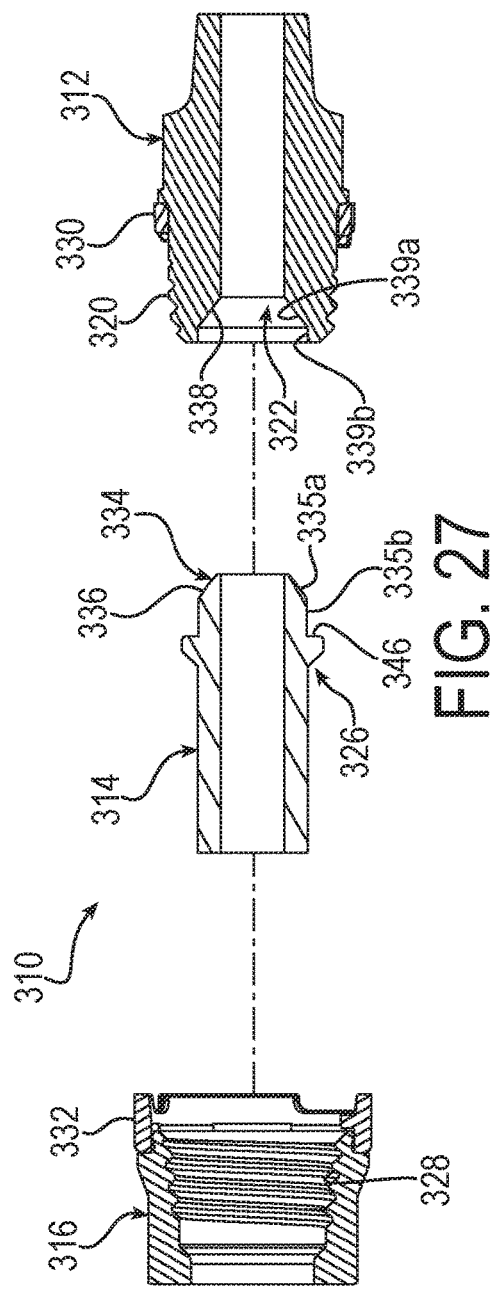

THREADED COUPLING ASSEMBLIES FOR INTERCONNECTING FLUID-CARRYING CONDUITS

RELATED APPLICATIONS

This application is a national phase of International Application No. PCT/US2020/034836 filed May 28, 2020, which claims the benefit of U.S. Provisional Application No. 62/861,102 filed Jun. 13, 2019, all of which are hereby incorporated herein by reference in their entireties.

FIELD OF INVENTION

The present invention relates to threaded coupling assemblies for interconnecting fluid-carrying conduits and, more particularly, to such assemblies having an indicator system for indicating complete make-up of the assembly and to such assemblies that have improved features for ensuring a leak-free connection.

BACKGROUND

Tube fitting connections heretofore have commonly used straight threads and are typically assembled using either a prescribed assembly angle or an assembly torque. Many of these fitting connections have no integral means to verify proper assembly, so a current practice is for installers/assemblers to manually mark the fitting once assembled to indicate a completed connection. These marks are commonly called torque stripes. Due to human and environmental factors, these marks may be incorrectly applied (e.g. incomplete connections marked as complete) on a regular basis and the result is leaking connections. Another inefficiency of these connections is that the straight threads are prone to cross threading and require a large assembly angle during the connection.

Threaded coupling assemblies such as that described in U.S. Pat. No. 9,714,732 have addressed the issue of detecting a complete connection by providing opposing indicator rings on each coupling having respective stop surfaces that together form a gap which closes when assembly is complete. This visual indication system also provides visually contrasting colors on each indicator ring to help identify a complete connection. Such a concept can be improved in at least two ways. First, it may be preferable that the visual indication call attention to an improper assembly instead of a proper assembly, so that appropriate steps can be taken to make the complete connection. Second, the two-color visual indication system may allow for an erroneous interpretation during the connection sequence due to conditions such as poor lighting, limited viewing angle, or installer visual impairment (e.g. color blindness).

SUMMARY OF INVENTION

The present invention provides a threaded coupling assembly having one or more features that enable ease of assembly and improve assurance that a complete connection of the assembly has been made. In addition, the coupling assembly may provide improved self-alignment during threading of the assembly, enhanced sealing functionality, and/or may be configured to minimize flow disruptions across the connection interface.

According to an aspect of the invention, a threaded coupling assembly for interconnecting fluid-carrying conduit members, includes: a union having a fluid passage for passage of a fluid, an external thread, and a receptacle; a tube end receivable in the receptacle of the union and having an internal passage for communicating with the fluid passage of the union; a coupling nut axially engageable with a radially outwardly protruding shoulder on the tube end, the coupling nut being rotatable about the tube end and having an internal thread for engaging the external thread of the union for securing the tube end to the union, wherein rotation of the coupling nut relative to the union causes the tube end to be forcibly drawn into the union for effecting a seal between the union and the tube end; and a pair of telescoping indicator rings respectively connected to the union and the coupling nut, the pair of telescoping indicator rings including a radially outer ring and a radially inner ring. The radially outer surface of the radially inner ring has over at least a first arcuate portion thereof a first visual characteristic contrasting with a second visual characteristic that extends over a second arcuate portion of the radially outer surface of the radially inner ring. The radially outer ring has a third visual characteristic that extends over at least a third arcuate portion of a radially outer surface of the radially outer ring, the third visual characteristic contrasting with the second visual characteristic of the radially inner ring. The radially outer ring has at least one circumferentially extending window that is at least partially encompassed by the third visual characteristic. The first visual characteristic and/or the second visual characteristic of the radially inner ring are viewable through the window of the radially outer ring during relative of rotation of the union and coupling nut from a partially assembled state to a fully assembled state. The threaded coupling assembly is configured such that the first visual characteristic of the radially inner ring is aligned with and viewable through the window of the radially outer ring when the threaded coupling assembly is in the fully assembled state to effect the seal between the union and the tube end. The threaded coupling assembly also is configured such that the first visual characteristic of the radially inner ring is out of alignment with the window of the radially outer ring when the threaded coupling assembly is not in the fully assembled state.

The second visual characteristic of the radially inner ring may be aligned with and/or viewable through the window of the radially outer ring to provide contrasting visual effect between the second visual characteristic and the third visual characteristic at least partially encompassing the window when the threaded coupling assembly is not in the fully assembled state.

By providing such contrasting effect between the second and third visual characteristics, the visual indication calls attention to an incomplete assembly instead of a complete assembly, so that appropriate steps can be taken to make the complete connection.

The first visual characteristic of the inner ring also may contrast with the third visual characteristic of the outer ring. This three-component contrasting approach may reduce erroneous interpretation in the operation due to conditions such as poor lighting, limited viewing angle, or installer visual impairment (e.g. color blindness).

According to another aspect of the invention, a threaded coupling assembly for interconnecting fluid-carrying conduit members, includes: a union having a fluid passage for passage of a fluid, an external tapered thread, and a receptacle; a machined tube end receivable in the receptacle of the union and having an internal passage for communicating with the fluid passage of the union, the tube end having a machined axially forward nose portion having a radially outer sealing surface that is configured to engage a radially inner sealing surface of the receptacle of the union, and the tube end having a machined radially outwardly protruding shoulder that is axially rearward of the forward nose portion; a coupling nut axially engageable with the shoulder of the tube end, the coupling nut being rotatable about the tube end and having an internal tapered thread for engaging the external thread of the union for securing the tube end to the union, wherein rotation of the coupling nut relative to the union causes the tube end to be forcibly drawn into the union from a partially assembled state to a fully assembled state for effecting a seal between the radially outer sealing surface of the tube end and the radially inner sealing surface of the union; and a pair of telescoping indicator rings respectively connected to the union and the coupling nut, the pair of telescoping indicator rings including a radially outer ring and a radially inner ring, the radially outer ring having at least one circumferentially extending window through which an arcuate segment of the radially inner ring can be viewed during relative of rotation of the union and coupling nut from the partially assembled state to the fully assembled state, the radially outer surface of the radially inner ring having over at least a first arcuate portion thereof a first visual characteristic contrasting with a second visual characteristic that extends over a second arcuate portion of the radially outer surface of the radially inner ring; wherein the shoulder of the tube end has an axially forwardly facing mating surface that is configured to interface with a mating face of the union to provide self-alignment of the respective tapered threads when the threaded coupling assembly is in the partially assembled state; wherein the first visual characteristic of the radially inner ring is aligned with and viewable through the window of the radially outer ring when the threaded coupling assembly is in the fully assembled state to effect the seal between the union and the tube end; and wherein the first visual characteristic of the radially inner ring is out of alignment with the window of the radially outer ring when the threaded coupling assembly is not in the fully assembled state.

Such a configuration of the shoulder provides self-alignment of the respective tapered threads when the threaded coupling assembly is in a partially assembled state. In this manner, any misalignment in the joint is corrected by a lever-type effect at the interface between the shoulder's forwardly facing surface and the mating face of the union.

Moreover, by providing tapered threads, the risk of cross threading is significantly minimized compared to straight threads. In addition, tapered threads significantly minimize the required assembly angle (e.g., number of turns) to make a complete connection between the tube end and the union.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 3 is an exploded left side perspective view of the threaded coupling assembly according to the first embodiment.

FIG. 4 is an exploded right side perspective view of the threaded coupling assembly according to the first embodiment.

FIG. 5A is a right side perspective view of the threaded coupling assembly according to the first embodiment shown in an exemplary first partially assembled state.

FIG. 5B is a front view of the threaded coupling assembly according to the first embodiment shown in the exemplary first partially assembled state.

FIG. 5C is a cross-sectional view of the threaded coupling assembly according to the first embodiment shown in the exemplary first partially assembled state.

FIG. 6A is a left side perspective view of the threaded coupling assembly according to the first embodiment shown in an exemplary second partially assembled state.

FIG. 6B is a cross-sectional view of the threaded coupling assembly according to the first embodiment shown in the exemplary second partially assembled state.

FIG. 16 is a cross-sectional side view of the threaded coupling assembly according to the first embodiment with an exemplary tube end swaged to a tube.

FIG. 17 is a cross-sectional side view of the threaded coupling assembly according to the first embodiment with an exemplary tube end welded to a tube.

FIG. 18 is an exploded front view of an exemplary threaded coupling assembly according to a second embodiment of the invention.

FIG. 19 is an exploded cross-sectional side view of the threaded coupling assembly according to the second embodiment.

FIG. 26 is an exploded front view of an exemplary threaded coupling assembly according to a fourth embodiment of the invention.

FIG. 27 is an exploded cross-sectional side view of the threaded coupling assembly according to the fourth embodiment.

DETAILED DESCRIPTION

Figure 1:
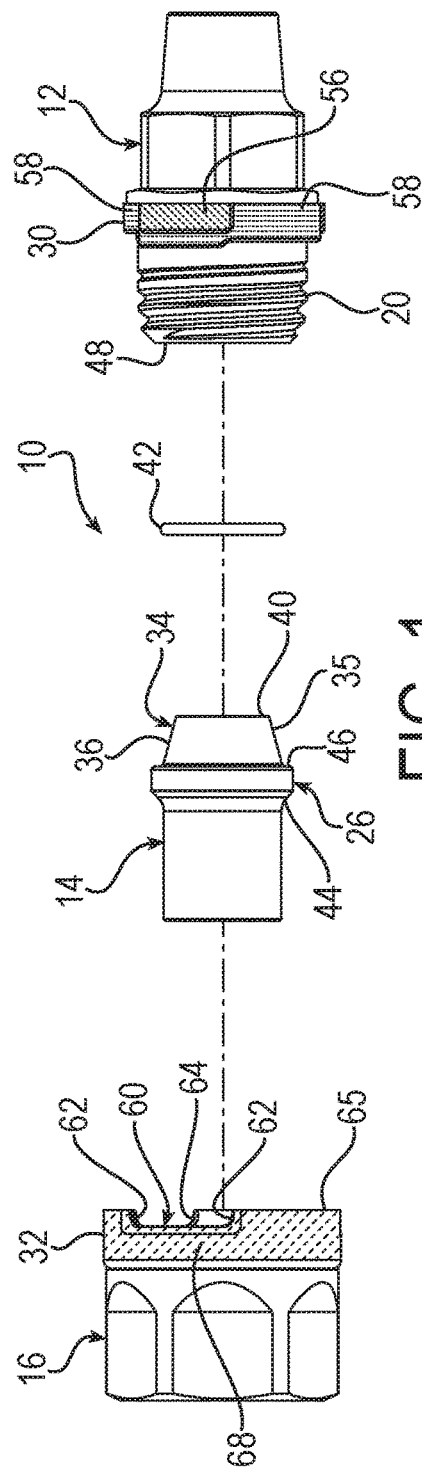
FIG. 1 is an exploded front view of an exemplary threaded coupling assembly according to a first embodiment of the invention.

Referring to FIGS. 1-7C, an exemplary threaded coupling assembly 10 for interconnecting fluid-carrying conduit members in a fixed releasable locking relationship is shown. As shown, the threaded coupling assembly 10 generally includes a union 12, a tube end 14, and a coupling nut 16. The union 12 generally includes a fluid passage 18 for passage of a fluid, an external thread 20, and a receptacle 22. The tube end 14 is receivable in the receptacle 22 of the union 12 and includes an internal passage 24 for communicating with the fluid passage 18 of the union 12.

The coupling nut 16 is axially engageable with a radially outwardly protruding shoulder 26 of the tube end 14 and is rotatable about the tube end 14. The nut 16 includes an internal thread 28 for engaging the external thread 20 of the union 12 for securing the tube end 14 to the union 12, in which rotation of the nut 16 relative to the union 12 causes the tube end 14 to be forcibly drawn into the union 12 from a partially assembled state to a fully assembled state for effecting a seal between the tube end 14 and the union 12. The coupling assembly 10 also includes a visual indicator system, including a pair of telescoping indicator rings 30, 32, for indicating when the threaded coupling assembly 10 is not in a fully assembled state and/or for indicating when the threaded coupling assembly 10 is in the fully assembled state, as discussed in further detail below.

In exemplary embodiments, the respective threads 20, 28 of the nut 16 and the union 12 are configured as tapered threads. By providing tapered threads, the risk of cross threading is significantly minimized compared to straight threads. In addition, tapered threads significantly minimize the required assembly angle (e.g., number of turns) to make a complete connection between the tube end 14 and the union 12. For example, in exemplary embodiments, the tapered threads 20, 28 may provide a complete connection between the tube end 14 and the union 12 in less than about one-half turn. This provides quicker assembly times making the coupling assembly 10 easier to fully assemble. It is understood, however, that although tapered threads may be preferred in some embodiments, in other embodiments the respective threads 20, 28 may be configured as straight threads.

Figure 2:
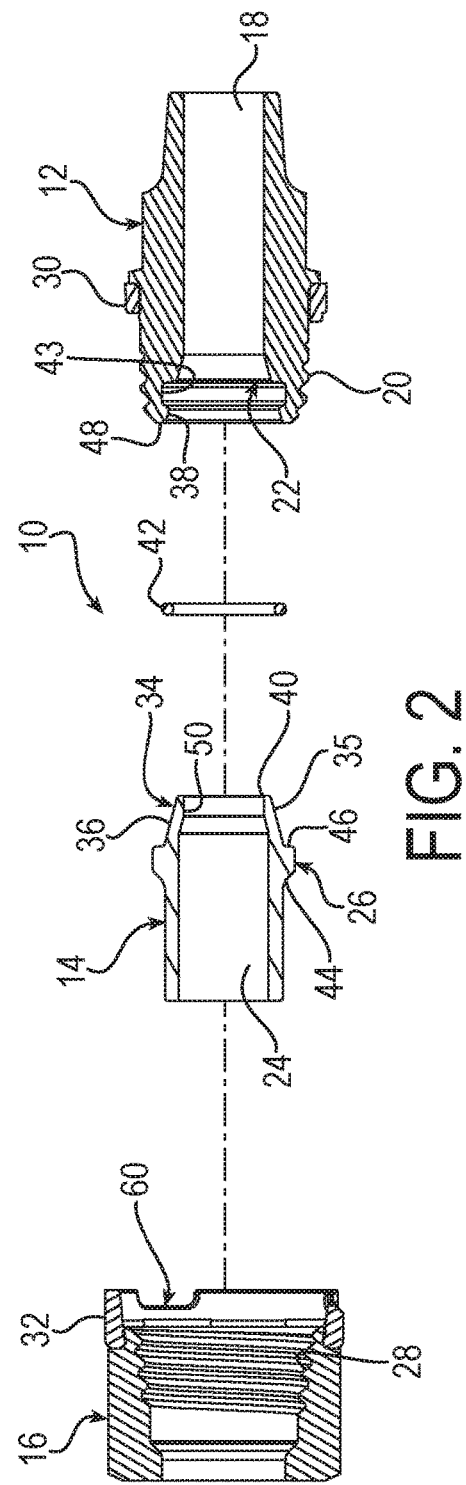
FIG. 2 is an exploded cross-sectional side view of the threaded coupling assembly according to the first embodiment.

The tube end 14 has an axially forward nose portion 34 having a radially outer sealing surface 36 that is configured to engage a radially inner sealing surface 38 of the receptacle 22 of the union 12 when rotation of the coupling nut 16 relative to the union 12 causes the tube end 14 to be forcibly drawn therein. In exemplary embodiments, the nose portion 34 is formed in a conical shape with tapered surface 35 that tapers radially inwardly from a location proximal the shoulder 26 toward an axial end face 40 of the tube end 14. As shown in FIGS. 2 and 7C, for example, the receptacle 22 of the union 12 includes a portion thereof having a correspondingly tapered internal surface for receiving the nose portion 34 of the tube end 14 to allow the respective sealing surfaces 36, 38 to sealingly engage when the coupling assembly 10 is fully assembled. It is understood that although the nose portion 34 is shown as cone-shaped, the shape of the nose portion 34 could be provided in other configurations, as shown in other embodiments described in further detail below.

In exemplary embodiments, the coupling assembly 10 may include a seal 42, such as an O-ring seal, which may be made of a resilient (e.g., elastomeric), non-metallic or metallic material. The seal 42 may provide a redundancy to the seal established between the sealing engagement of the respective sealing surfaces 36, 38 of the tube end 14 and union 12. As shown in the illustrated embodiment, the seal 42 is disposed in a radial groove 43 in an internal surface of the union 12 and is configured to sealingly engage against the nose portion 34 of the tube end 14 at an axially forward position relative to the sealing surface 36.

As shown, the shoulder 26 of the tube end 14 is located axially rearward of the forward nose portion 34 and includes an axially rearwardly facing surface 44 and an axially forwardly facing surface 46. The axially rearwardly facing surface 44 is configured to be engaged by the nut 16 to drive the tube end 14 forward into the union 12 for effecting sealing when fully assembled. In exemplary embodiments, the axially forwardly facing surface 46 is configured to interface with a mating face 48 of the union 12 to provide self-alignment of the respective tapered threads 20, 28 when the threaded coupling assembly 10 is in a partially assembled state. In this manner, any misalignment in the joint is corrected by a lever-type effect at the interface between the shoulder's forwardly facing surface 46 of the tube end 14 and the mating face 48 of the union 12.

For example, referring to FIGS. 5A-7C, exemplary states during assembly of the coupling assembly 10 are shown. FIGS. 5A-5C show a first partially assembled (e.g., hand-tight) state in which a full connection between the tube end 14 and union 12 is not yet made. FIGS. 6A and 6B show a second (intermediate) partially assembled (e.g., torqued) state beyond the hand-tight state in which the forward facing surface 46 of the tube end's shoulder 26 engages, or blocks, against the mating face 48 of the union 12. In this state, a complete connection also is not yet made because the respective sealing surfaces 36, 38 of the tube end 14 and union 12 have not sufficiently engaged to provide a suitable seal. FIGS. 7A-7C show a fully assembled state in which the nut 16 has been further torqued beyond the intermediate state shown in FIGS. 6A and 6B. In this state, the respective sealing surfaces 36, 38 of the tube end 14 and union 12 are sufficiently engaged to provide a suitable leak-proof seal. Some compression between the respective sealing surfaces 36, 38 and/or other regions of the tube end 14 and union 12 may occur in this fully-assembled state, which may cause elastic and/or some plastic deformation of the material forming those portions of the tube end 14 and the union 12.

Figure 7A:
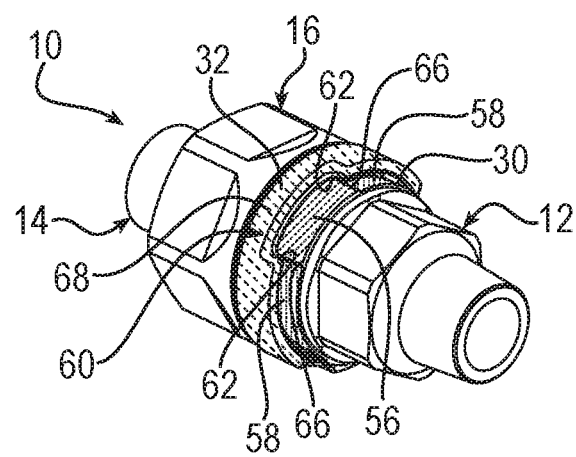
FIG. 7A is a right side perspective view of the threaded coupling assembly according to the first embodiment shown in an exemplary fully assembled state.
Figure 7B:
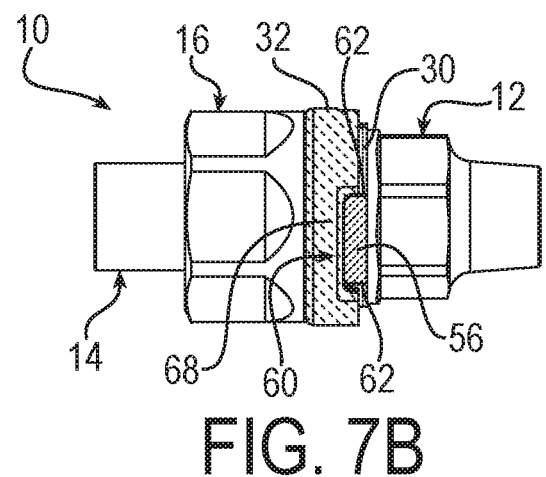
FIG. 7B is a front view of the threaded coupling assembly according to the first embodiment shown in the exemplary fully assembled state.
Figure 7C:
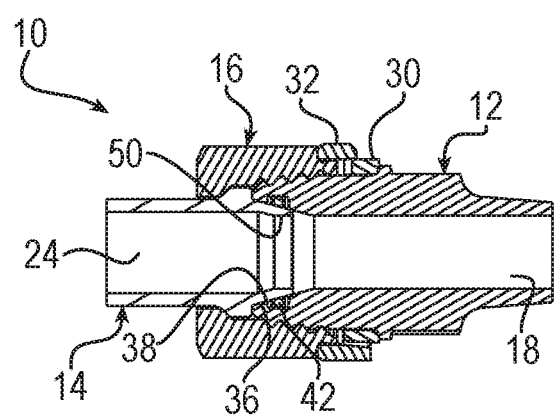
FIG. 7C is a cross-sectional view of the threaded coupling assembly according to the first embodiment shown in the exemplary fully assembled state.
Figure 8:
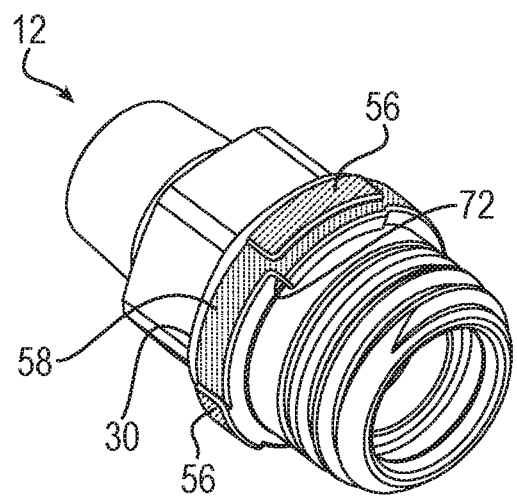
FIG. 8 is a perspective view of an exemplary union having an exemplary radially inner indicator ring according to the first embodiment.
Figure 9:
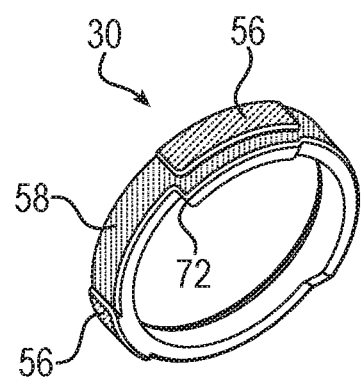
FIG. 9 is a perspective view of the exemplary radially inner ring.
Figure 10:
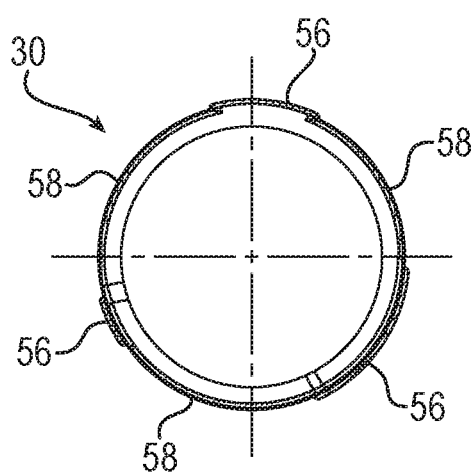
FIG. 10 is a top plan view of the exemplary radially inner ring.
Figure 11:
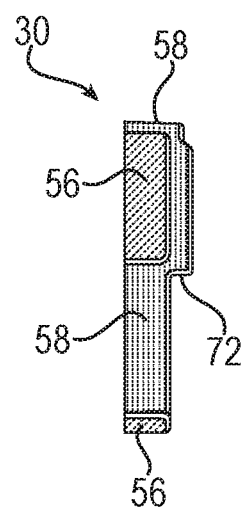
FIG. 11 is a side view of the exemplary radially inner ring.
Figure 12:
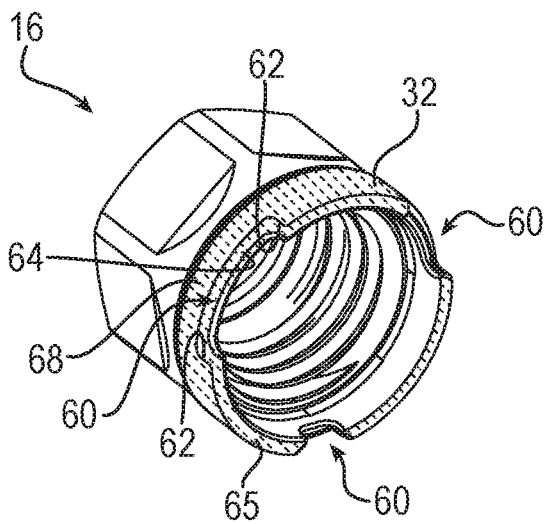
FIG. 12 is a perspective view of an exemplary coupling nut having an exemplary radially outer indicator ring according to the first embodiment.
Figure 13:
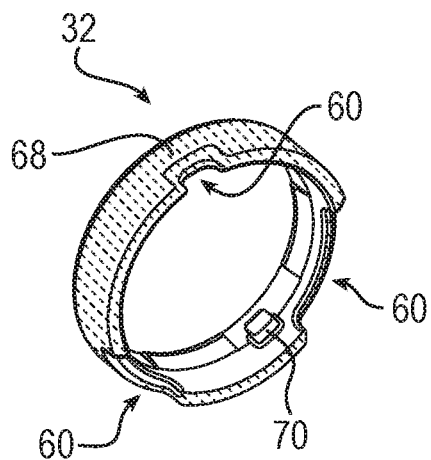
FIG. 13 is a perspective view of the exemplary radially outer ring.
Figure 14:
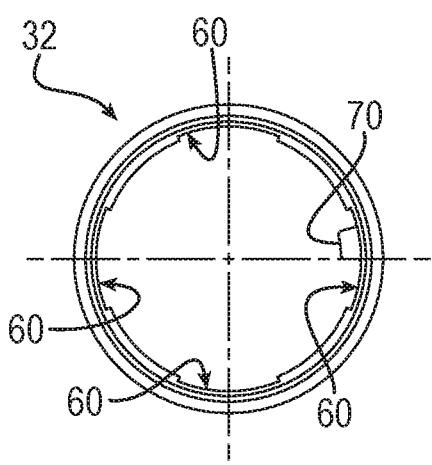
FIG. 14 is a top plan view of the exemplary radially outer ring.
Figure 15:
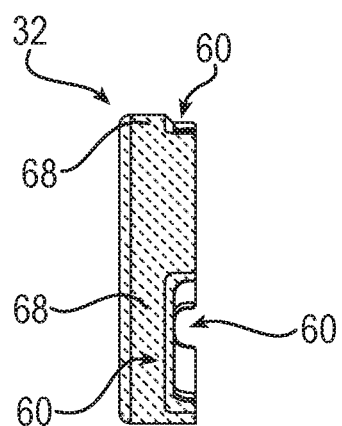
FIG. 15 is a side view of the exemplary radially outer ring.

As shown in the illustrated embodiment, the axially forwardly facing surface 46 of the shoulder 26 may be specifically positioned relative to the sealing surface 36 of the nose portion 34 of the tube end 14, the sealing surface 38 of the union 12, and the mating face 48 of the union 12 to provide the initial engagement that facilitates the self-alignment functionality described above when tightening from the intermediate partially assembled state (FIGS. 6A and 6B) to the fully assembled state (FIGS. 7A-C). In exemplary embodiments, the axially forwardly facing surface 46 of the shoulder 26 is configured to be perpendicular to the axis of the tube end 14 for engaging the axial end face (also referred to with reference numeral 48) of the union 12. It is understood, however, that other configurations of the axially forwardly facing surface 46 and/or the mating face 48 of the union 12 may be provided. For example, the axially forwardly facing surface 46 of the shoulder 26 may have a recess, a protrusion, or may be tapered to engage a complimentarily shaped mating face 48 of the union 12. It is also understood that other portions of the union 12 other than the axial end face 48 may be provided as the mating face, as would be understood by those having ordinary skill in the art.

In exemplary embodiments, an internal surface 50 of the tube end 14 that forms at least a portion of the internal fluid passage 24 proximal the end face 40 is designed to minimize disruption of fluid conveyance between the tube end 14 and the union 12. More particularly, as shown in FIG. 7C, for example, the diameter of the internal surface 50 of the tube end 14 may be configured to match the internal diameter of the fluid passage 18 of the union 12 to minimize such fluid flow disruptions. Also as shown in the illustrated embodiment, the transition across the interface between the union 12 and the tube end 14 may be configured to provide a relatively smooth transition that minimizes the number of protuberances to further facilitate the smooth passage of fluid flow.

In exemplary embodiments, the tube end 14 is formed as a sleeve (also referred to with reference numeral 14) that is machined into the desired shape, including machining of the nose portion 34, the shoulder 26, and the like. Such machining of the sleeve component 14 permits forming these exemplary structures where tubing materials and/or geometries might not otherwise be capable of being deformed into the desired shape and/or with the precise geometries (e.g., providing a location and/or configuration of the shoulder 26 for providing the self-alignment features, as discussed above).

With exemplary reference to FIGS. 16 and 17, the tube end 14 in the form of a sleeve may be attached to a fluid conduit 52 (e.g., tube 52) in any suitable manner. For example, in FIG. 16 the tube end 14 is attached to the tube 52 via swaging, such as internal swaging (e.g., roller or elastomeric) or external swaging (e.g., radial or axial). In FIG. 17, the tube end 14 is attached to the tube 52 by welding a rearward end portion 54 of the tube end 14 to a forward end face 55 of the tube 52. Other suitable forms of attachment, such as brazing or the like, also may be employed. It is understood that although the tube end 14 is shown in the illustrated embodiments as a sleeve 14 attached to the tube 52, in some embodiments the tube end 14 may be integrally formed from the end of the tube 52, such as via machining the end of the tube 52.

Referring again generally to FIGS. 1-7C and as mentioned above, the coupling assembly 10 also includes a visual indicator system, including telescoping indicator rings 30, 32, for indicating when the threaded coupling assembly 10 is not in a fully assembled state and/or for indicating when the threaded coupling assembly 10 is in the fully assemble state. As shown in the illustrated embodiment, the telescoping indicator rings include a radially inner ring 30 and a radially outer ring 32. In the illustrated embodiment, the radially outer ring 32 is connected to the coupling nut 16 and the radially inner ring 30 is connected to the union 12, although in other embodiments this may be reversed. The indicator rings 30, 32 are configured such that when the union 12 and the nut 16 are threaded together, the radially outer ring 32 telescopically moves over the radially inner ring 30. The telescopic movement may include sliding engagement between the inner and outer rings 30, 32, or the telescopic movement may include the inner and outer rings 30, 32 axially overlapping in spaced apart relationship. During the assembly, the result is that the radially outer ring 32 progressively reduces the visible portion of the radially inner ring 30.

In exemplary embodiments, the radially outer surface of the radially inner ring 30 has over at least a first arcuate portion thereof a first visual characteristic 56 that contrasts with a second visual characteristic 58 that extends over a second arcuate portion of the radially outer surface of the radially inner ring 30. In the illustrated embodiment, the first and second visual characteristics 56, 58 are circumferentially offset relative to each other. As shown, the circumferential offset may include the first and second visual characteristics 56, 58 being adjacent to and abutting each other, or the circumferential offset may include the first and second visual characteristics 56, 58 being circumferentially spaced apart.

The radially outer ring 32 has at least one circumferentially extending window 60 through which an arcuate segment of the radially inner ring 30 can be viewed during relative of rotation of the union 12 and the coupling nut 16 from the partially assembled state to the fully assembled state. As discussed in further detail below, this allows the respective first and/or second visual characteristics 56, 58 of the radially inner ring 30 to be viewed for determining whether the threaded coupling assembly 10 is not in the fully assembled position and/or for indicating when the threaded coupling assembly is in the fully assemble position. In exemplary embodiments, the window 60 is of fixed arcuate length and is circumferentially bounded by axially extending circumferential end portions 62. In the illustrated embodiment, the window 60 is formed as a notched or cutout portion of the radially outer ring 32 that opens forwardly, and has an axial end surface 64 that is axially spaced apart by an axial depth from an axially forward end surface 65 of the radially outer ring 30.

Referring to FIGS. 5A-7C, an exemplary operation of determining whether the threaded coupling assembly 10 is not in the fully assembled state and/or for indicating when the threaded coupling assembly 10 is in the fully assemble state is shown. As shown in FIGS. 5B, 6A and 6B, for example, when the threaded coupling assembly 10 is not in the fully assembled state, the first visual characteristic 56 of the radially inner ring 30 is out of alignment with the window 60 of the radially outer ring 32. As shown in the illustrated incomplete state, the second visual characteristic 58 of the radially inner ring 30 is viewable through and/or is aligned with the window 60 for indicating the incomplete connection.

Turning to FIGS. 7A and 7B, when the nut 16 and radially outer indicator ring 32 are rotated relative to the union 12 and the radially inner indicator ring 30, the tube end 14 is forcibly drawn into the union 12 to make the proper connection in the fully assembled stated. As shown in this state, the first visual characteristic 56 of the radially inner ring 30 is aligned with and viewable through the window 60 of the radially outer ring 32 to indicate that a complete connection has been made. In the illustrated embodiment, such alignment is shown by circumferential end portions 66 of the first visual characteristic 56 aligning with (e.g., generally abutting) the circumferential end portions 62 of the window 60. In other embodiments, the alignment of the first visual characteristic 56 with the window 60 may be made by the first visual characteristic 56 filling up the window 60 (e.g., extending beyond the circumferential end portions 62 of the window 60), or may be made by the circumferential end portions 66 of the first visual characteristic 56 falling within the circumferential end portions 62 of the window 60, for example.

In exemplary embodiments, the radially outer ring 32 has a third visual characteristic 68 that extends over at least a third arcuate portion of a radially outer surface of the radially outer ring 32, in which this the third visual characteristic 68 contrasts with the second visual characteristic 58 of the radially inner ring 30. As shown, the window 60 is at least partially encompassed by this third visual characteristic 68 to provide contrasting effect with at least some portions of the radially inner ring 30, and particularly provides contrasting effect with respect to the second visual characteristic 58 that indicates an incomplete connection (as shown in FIGS. 5A and 6A, for example). For example, in the illustrated embodiment the entire outer ring 32 is formed of a single color (e.g., black or blue) to provide the third visual characteristic 68 that contrasts with a color (e.g., red) of the second visual characteristic 58 of the inner ring 30. By providing such contrasting effect between the second and third visual characteristics 58, 68, the visual indication calls attention to an incomplete assembly instead of a complete assembly, so that appropriate steps can be taken to make the complete connection. In the illustrated embodiment, the first visual characteristic 56 of the inner ring 30 that is for indicating a complete connection also contrasts with the third visual characteristic 68 of the outer ring 32. For example, the first visual characteristic 56 may have a color (e.g., yellow or green) that contrasts with both the color of the second visual characteristic 58 of the inner ring 30 (e.g., red) and the third visual characteristic 68 of the outer ring 32 (e.g., black or blue). This three-component contrasting approach reduces erroneous interpretation in the operation due to conditions such as poor lighting, limited viewing angle, or installer visual impairment (e.g. color blindness).

In exemplary embodiments, the first arcuate portion of the inner ring 30 having the first visual characteristic 56 may include a plurality of circumferentially spaced apart first arcuate portions having respective circumferentially spaced apart first visual characteristics 56 (e.g., color stripes). The second arcuate portion of the inner ring 30 having the second visual characteristic 58 also may include a plurality of second arcuate portions having respective second visual characteristics 58 that are interposed between the respective first visual characteristics 56. Similarly, the outer ring 32 may include a plurality of windows 60 circumferentially spaced apart to provide a wider viewing angle for determining when an incomplete or complete connection has been made. As is apparent, the one or more first visual characteristics 56, one or more second visual characteristics 58, and one or more windows 60 are strategically positioned relative to each other and relative to other portions of the nut 16 and union 12 (e.g., respective threads 20, 28, etc.) to ensure the that the indication of completeness or incompleteness is accurate.

It is understood that although the first, second and third visual characteristics 56, 58, 68 are preferably different color choices, other visual characteristics may be used alternatively or additionally. For example, the visual characteristics 56, 58, 68 may be shapes, symbols, patterns, texturing, photoluminescence and/or other visually identifiable features. Alternatively or additionally, first, second, third, etc. tactile characteristics may be employed in a similar manner as above, such as surface texturing or other structural characteristics perceptible by touch. The colors described above are merely exemplary, and any other suitable color combination may be chosen, such as for providing enhanced visually contrasting effect as may be desirable for particular applications. In some embodiments, the third visual characteristic 68 of the outer ring 32 may be applied as trim around one or more portions of the window 60 to provide the contrasting effect (see e.g., FIG. 26), or an arcuate segment of the outer ring 32 having the window 60 may have the third visual characteristic 68 (e.g., color) different from other portions of the outer ring 32. It is also understood that although the three-component contrasting approach described above may be preferred, that in some embodiments only two such contrasting visual characteristics may be employed. For example, the third visual characteristic 68 of the outer ring 32 may match with the first visual characteristic 56 of the inner ring 30 (e.g., same colors) to provide an indication of a complete connection when matched, while both the first and third visual characteristics 56, 68 may contrast with the second visual characteristic 58 of the inner ring 30 to provide an indication of incompleteness when not properly assembled. It is also understood that in some embodiments four or more visually contrasting elements may be employed.

Referring to FIGS. 8-15, the telescoping indicator rings 30, 32 will be described in further detail. When using such coupling assemblies 10 in practice it can happen that the coupling assembly 10 is inadvertently assembled too forcefully (e.g., the nut 16 is over-tightened) during initial assembly in a manner that is not needed for the reliability of the connection. However, such over-tightening can, in some instances, deform the material of the union 12 and/or tube end 14, thereby affecting the relative position of the complete connection between these components. Thus, if in the event of initial over-assembly the nut 16 were to be turned back to reach the marking indicating a fully assembled state, it is possible that a complete connection might not be made.

To reduce or eliminate the effects of over-assembly during the initial assembly of the coupling assembly 10, in exemplary embodiments at least one of the indicator rings 30, 32, after reaching a stop through the relative movement resulting from threading of the nut 16 onto the union 12, is arranged in a rotatable manner relative to its corresponding body (e.g., the union 12 or the nut 16) after a predefined resistance has been overcome. Thus, when this rotatable indicator ring 30, 32 comes into contact with the stop surface at the end of the assembly path during initial assembly, with a further turn of the nut 16 in the event of over-assembly the rotatably arranged indicator ring 30, 32 is carried along and offset when the predefined resistance has been overcome (e.g., via application of torque), whereby this new position of the moved indicator ring 30, 32 stops with its visual characteristic(s) 56, 58, 68 in the position corresponding to the over-assembled state. In this manner, a corresponding realignment of the rotatable indicator ring 30, 32 takes place. If the coupling assembly 10 is later loosened, the indicator ring 30, 32 offset during the over-assembly remains in the position determined by the over-assembly, and on repeated assembly the nut 16 has to be moved into the over-assembled position reached during initial assembly before a completed assembly is indicated.

FIGS. 8-11 show the inner indicator ring 30, which is attached to the union 12 in the illustrated embodiment. FIGS. 12-15 show the outer indicator ring 32, which is attached to the nut 16 in the illustrated embodiment. As shown, both the inner indicator ring 30 and the outer indicator ring 32 are configured as discrete components that are respectively connected to the union 12 and the nut 16 for co-rotation therewith. In exemplary embodiments, at least the outer ring 32 is frictionally held to the nut 16, such as with an interference fit between the two components. As shown, the outer ring 32 includes a stop 70, such as a radially inwardly protruding abutment or nub. The inner ring 30 also includes a stop 72, such as an axially extending abutment or ridge. When the nut 16 with the outer ring 32 is advanced relative to the union 12 with the inner ring 30 to the fully assembled position, the respective stops 70, 72 of the indicator rings 32, 30 may engage each other. If the coupling assembly 10 is over-assembled with further advancement of the nut 16, then the predefined resistance (e.g., static friction force) holding the outer ring 32 in place on the nut 16 may be overcome, thereby repositioning the outer ring 32 on the nut 16 in a position offset from its initial position. The outer ring 32 being offset in this way during the over-assembly remains in this position via its frictional attachment (e.g., interference fit), and upon reassembly the nut 16 will be moved to this new over-assembled position to align the respective visual characteristics 56, 60 (as discussed above) to indicate a complete connection. It is understood that such features of realignment and frictional attachment (e.g., interference fit) may be applied alternatively or additionally to the inner ring 30 attached to the union 12 as well.

Turning to FIGS. 18-21, another exemplary embodiment of a threaded coupling assembly 110 is shown. The coupling assembly 110 is substantially the same as the above-referenced coupling assembly 10, and consequently the same reference numerals but indexed by 100 are used to denote structures corresponding to the same or similar structures in the coupling assemblies 10, 110. In addition, the foregoing description of the coupling assembly 10 is equally applicable to the coupling assembly 110 except as noted below. Moreover, it is understood that aspects of the coupling assemblies 10, 110 may be substituted for one another or used in conjunction with one another where applicable.

Similarly to the coupling assembly 10, the coupling assembly 110 generally includes a union 112, a tube end 114, and a coupling nut 116. The coupling assembly 110, however, has a different configuration for the axially forward nose portion 134 of the tube end 114. In the illustrated embodiment, the nose portion 134 has two inwardly tapered surfaces 135a, 135b with different angles at axially offset positions. The axially forward tapered surface 135a has a greater incline relative to the axis of the tube end 114 compared to the axially rearward tapered surface 135b, and may provide initial alignment when contacting the internal surface of the receptacle 122 of the union 112. The axially rearward tapered surface 135b includes the sealing surface 136 that is configured to engage the radially inner sealing surface 138 of the receptacle 122. The axially rearward tapered surface 135b has a smaller contact area compared to the tapered surface 35 of nose portion 34 of the coupling assembly 10, which increases contact pressure to enhance sealing integrity.

Similarly to the coupling assembly 10, in exemplary embodiments the coupling assembly 110 utilizes respective tapered threads 120, 128 for the nut 116 and the union 112 to minimize the risk of cross-threading and to minimize the number of turns to make a complete connection. In exemplary embodiments, the shoulder 126 may have an axially forwardly facing surface 146 that is configured to interface with a mating face 148 of the union 112 to provide self-alignment of the respective tapered threads 120, 128 when the threaded coupling assembly 110 is in a partially assembled state (e.g., beyond hand-tight), although such engagement of the shoulder 126 with the mating face 148 is not shown in the illustrated embodiment. The coupling assembly 110 also may include a backup seal 142 disposed in a radial groove 143 of the union 112.

Also similarly to the coupling assembly 10, the coupling assembly 110 includes a pair of telescoping indicator rings 130, 132 respectively connected to the union 112 and the coupling nut 116. The pair of telescoping indicator rings includes radially inner ring 130 and radially outer ring 132, which are configured substantially the same as the indicator rings 30, 32 described above. As such, the radially outer surface of the radially inner ring 130 has over at least a first arcuate portion thereof a first visual characteristic 156 (e.g., color, such as yellow or green) contrasting with a second visual characteristic 158 (e.g., color, such as red) that extends over a second arcuate portion of the radially outer surface of the radially inner ring 130. The radially outer ring 132 has a third visual characteristic 168 that extends over at least a third arcuate portion of a radially outer surface of the radially outer ring 132, in which this third visual characteristic 168 (e.g., color, such as black or blue) may contrast with the second visual characteristic 158 (e.g., color, such as red) of the radially inner ring 130. The outer ring 132 has at least one circumferentially extending window 160 that is at least partially encompassed by the third visual characteristic 168, such as having the outer ring 132 as a single color (as shown) or by having the window 160 trimmed with such visual characteristic 168.

Figure 20:
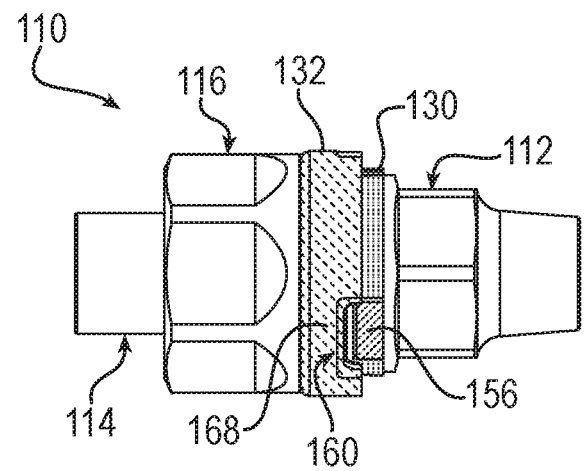
FIG. 20 is a front view of the threaded coupling assembly according to the second embodiment shown in an exemplary fully assembled state.
Figure 21:
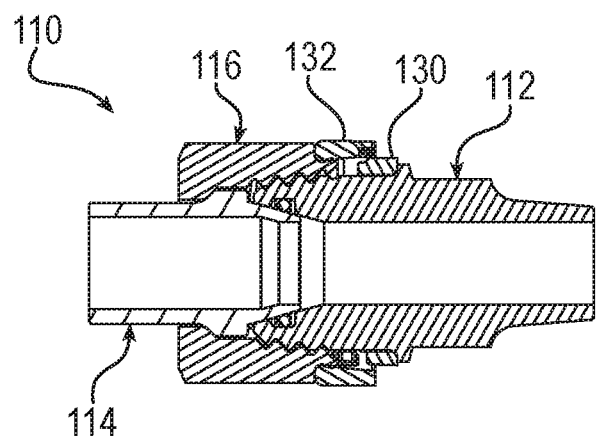
FIG. 21 is a cross-sectional view of the threaded coupling assembly according to the second embodiment shown in the exemplary fully assembled state.
Figure 22:
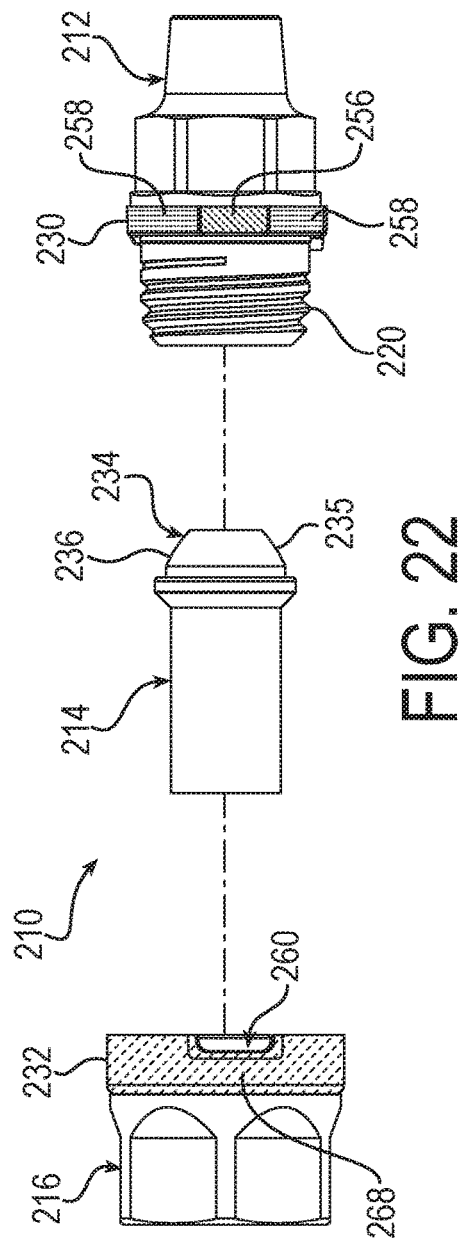
FIG. 22 is an exploded front view of an exemplary threaded coupling assembly according to a third embodiment of the invention.
Figure 23:
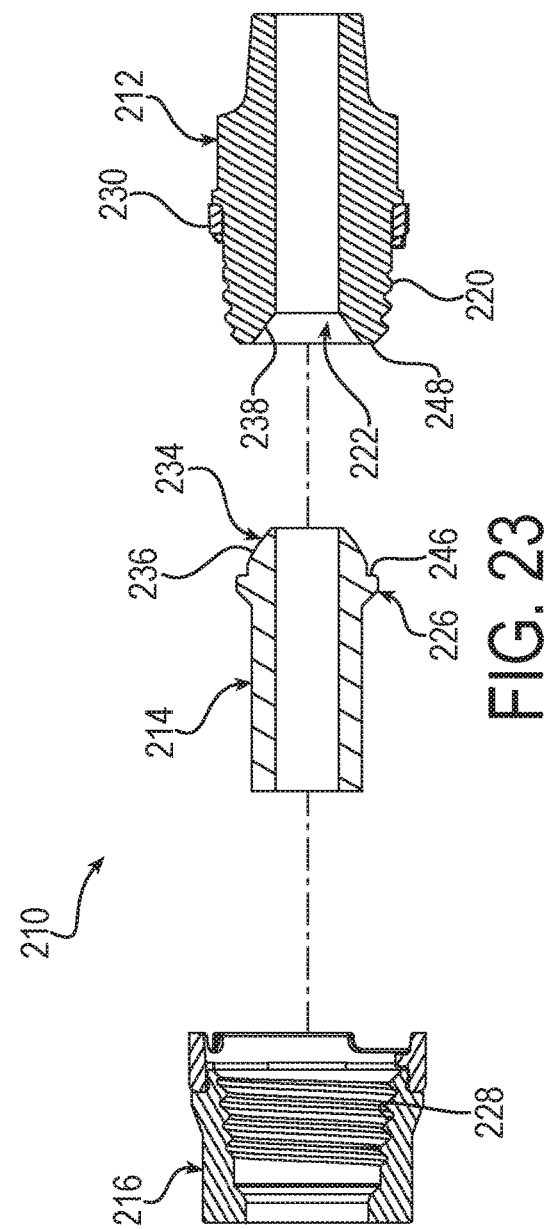
FIG. 23 is an exploded cross-sectional side view of the threaded coupling assembly according to the third embodiment.

Similarly to the coupling assembly 10, the threaded coupling assembly 110 is configured such that the first visual characteristic 156 of the inner ring 130 is aligned with and viewable through the window 160 of the outer ring 132 when the threaded coupling assembly is in the fully assembled state (as shown in FIG. 20, for example). Likewise, the first visual characteristic 156 of the inner ring 130 is out of alignment with the window 160 when the coupling assembly 110 is not in the fully assembled state (not shown). In the incomplete state (not shown), the second visual characteristic 158 of the inner ring 130 may align with and/or be viewed through the window 160 to provide contrasting visual effect between the second visual characteristic 158 and the third visual characteristic 168 at least partially encompassing the window 160, thereby providing an indication of incompleteness of the connection.

Turning to FIGS. 22-25, another exemplary embodiment of a threaded coupling assembly 210 is shown. The coupling assembly 210 is substantially the same as the above-referenced coupling assembly 10, and consequently the same reference numerals but indexed by 200 are used to denote structures corresponding to the same or similar structures in the coupling assemblies 10, 210. In addition, the foregoing description of the coupling assemblies 10, 110 are equally applicable to the coupling assembly 210 except as noted below. Moreover, it is understood that aspects of the coupling assemblies 10, 110, 210 may be substituted for one another or used in conjunction with one another where applicable.

Similarly to the coupling assembly 10, the coupling assembly 210 generally includes a union 212, a tube end 214, and a coupling nut 216. The coupling assembly 210, however, has a different configuration for the axially forward nose portion 234 of the tube end 214. In the illustrated embodiment, the nose portion 234 has a spherical surface 235 instead of conical. The spherical surface 235 of the nose portion 234 provides for a more reliable seal between respective sealing surfaces 236, 238 of the tube end 214 and union 212, even under conditions of misalignment.

Similarly to the coupling assembly 10, in exemplary embodiments the coupling assembly 210 utilizes respective tapered threads 220, 228 for the nut 216 and the union 212 to minimize the risk of cross-threading and to minimize the number of turns to make a complete connection. The shoulder 226 may have an axially forwardly facing surface 246 that is configured to interface with a mating face 248 of the union 212 to provide self-alignment of the respective tapered threads 220, 228 when the threaded coupling assembly 210 is in a partially assembled state (e.g., beyond hand-tight), although such engagement of the shoulder 226 with the mating face 248 is not shown in the illustrated embodiment. In the illustrated embodiment, the coupling assembly 210 is devoid of a backup (e.g., elastomeric) seal, and instead relies on the metal-to-metal seal provided between the respective sealing surfaces 236, 238 of the tube end 214 and union 212. It is understood, however, that a backup seal may be provided.

Also similarly to the coupling assembly 10, the coupling assembly 210 includes a pair of telescoping indicator rings 230, 232 respectively connected to the union 212 and the coupling nut 216. The pair of telescoping indicator rings includes radially inner ring 230 and radially outer ring 232, which are configured substantially the same as the indicator rings 30, 32 described above. As such, the radially outer surface of the radially inner ring 230 has over at least a first arcuate portion thereof a first visual characteristic 256 (e.g., color, such as yellow or green) contrasting with a second visual characteristic 258 (e.g., color, such as red) that extends over a second arcuate portion of the radially outer surface of the radially inner ring 230. The radially outer ring 232 has a third visual characteristic 268 that extends over at least a third arcuate portion of a radially outer surface of the radially outer ring 232, in which this third visual characteristic 268 (e.g., color, such as black or blue) may contrast with the second visual characteristic 258 (e.g., color, such as red) of the radially inner ring 230. The outer ring 232 has at least one circumferentially extending window 260 that is at least partially encompassed by the third visual characteristic 268, such as having the outer ring 232 as a single color (as shown) or by having the window 260 trimmed with such visual characteristic 268.

Figure 24:
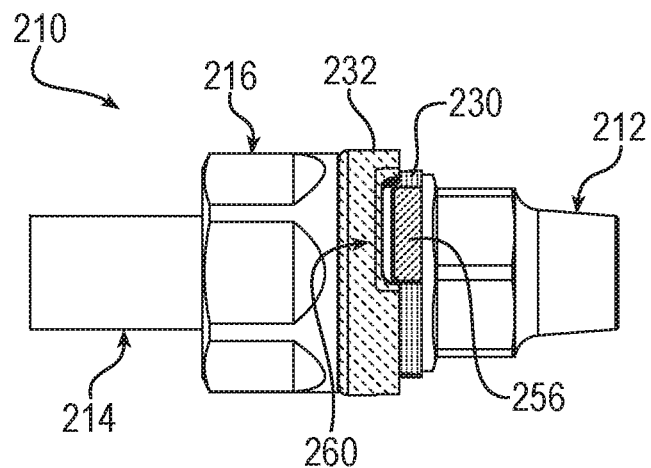
FIG. 24 is a front view of the threaded coupling assembly according to the third embodiment shown in an exemplary fully assembled state.
Figure 25:
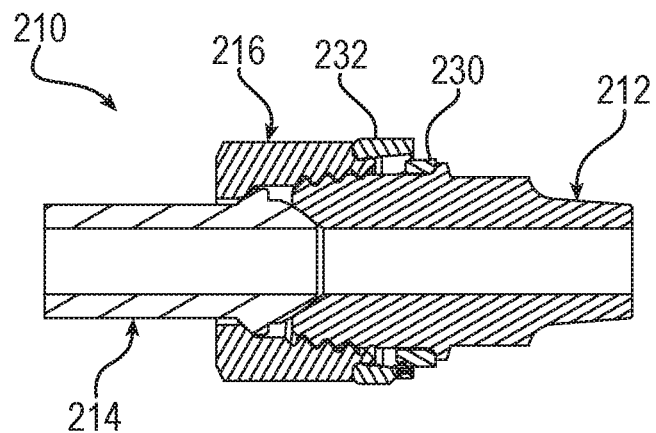
FIG. 25 is a cross-sectional view of the threaded coupling assembly according to the third embodiment shown in the exemplary fully assembled state.

Similarly to the coupling assembly 10, the threaded coupling assembly 210 is configured such that the first visual characteristic 256 of the inner ring 230 is aligned with and viewable through the window 260 of the outer ring 232 when the threaded coupling assembly is in the fully assembled state (as shown in FIG. 24, for example). Likewise, the first visual characteristic 256 of the inner ring 230 is out of alignment with the window 260 when the coupling assembly 210 is not in the fully assembled state (not shown). In the incomplete state (not shown), the second visual characteristic 258 of the inner ring 230 may align with and/or be viewed through the window 260 to provide contrasting visual effect between the second visual characteristic 258 and the third visual characteristic 268 at least partially encompassing the window 260, thereby providing an indication of incompleteness of the connection.

Turning to FIGS. 26-29, another exemplary embodiment of a threaded coupling assembly 310 is shown. The coupling assembly 310 is substantially the same as the above-referenced coupling assembly 10, and consequently the same reference numerals but indexed by 300 are used to denote structures corresponding to the same or similar structures in the coupling assemblies 10, 310. In addition, the foregoing description of the coupling assemblies 10, 110, 210 are equally applicable to the coupling assembly 310 except as noted below. Moreover, it is understood that aspects of the coupling assemblies 10, 110, 210, 310 may be substituted for one another or used in conjunction with one another where applicable.

Similarly to the coupling assembly 10, the coupling assembly 310 generally includes a union 312, a tube end 314, and a coupling nut 316. The coupling assembly 310, however, has a different configuration for the axially forward nose portion 334 of the tube end 314. In the illustrated embodiment, the nose portion 334 has an axially extending cylindrical surface 335*b* that axially spaces a radially inwardly tapered surface 335*a* from the shoulder 326. The union 312 is complimentarily configured with an axially extending annular internal surface 339*b* that axially spaces an internal tapered surface 339*a* from the front face 348. Such a configuration may minimize the total connection envelope dimensions and/or provide additional self-aligning features.

Similarly to the coupling assembly 10, in exemplary embodiments the coupling assembly 310 utilizes respective tapered threads 320, 328 for the nut 316 and the union 312 to minimize the risk of cross-threading and to minimize the number of turns to make a complete connection. The shoulder 326 may have an axially forwardly facing surface 346 that is configured to interface with a mating face 348 of the union 312 to provide self-alignment of the respective tapered threads 320, 328 when the threaded coupling assembly 310 is in a partially assembled state (e.g., beyond hand-tight), although such engagement of the shoulder 326 with the mating face 348 is not shown in the illustrated embodiment. In the illustrated embodiment, the coupling assembly 310 is devoid of a backup (e.g., elastomeric) seal, and instead relies on the metal-to-metal seal provided between the respective sealing surfaces 336, 338 of the tube end 314 and union 312.

Also similarly to the coupling assembly 10, the coupling assembly 310 includes a pair of telescoping indicator rings 330, 332 respectively connected to the union 312 and the coupling nut 316. The pair of telescoping indicator rings includes radially inner ring 330 and radially outer ring 332, which are configured substantially similar to the indicator rings 30, 32 described above. As such, the radially outer surface of the radially inner ring 330 has over at least a first arcuate portion thereof a first visual characteristic 356 (e.g., color, such as yellow or green) contrasting with a second visual characteristic 358 (e.g., color, such as red) that extends over a second arcuate portion of the radially outer surface of the radially inner ring 330. The radially outer ring 332 has a third visual characteristic 368 that extends over at least a third arcuate portion of a radially outer surface of the radially outer ring 332, in which this third visual characteristic 368 (e.g., color, such as black or blue) may contrast with the second visual characteristic 358 (e.g., color, such as red) of the radially inner ring 330. The outer ring 332 has at least one circumferentially extending window 360 that is at least partially encompassed by the third visual characteristic 368, such as having the window 360 trimmed with such visual characteristic 368 (as shown) or by having the outer ring 332 as a single color, for example.

Figure 28:
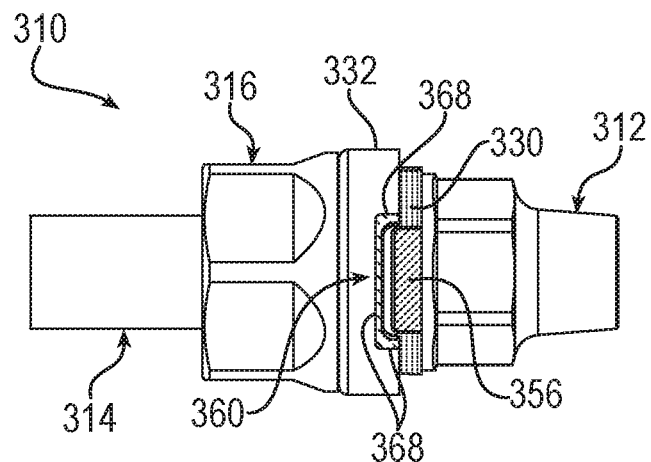
FIG. 28 is a front view of the threaded coupling assembly according to the fourth embodiment shown in an exemplary fully assembled state.
Figure 29:
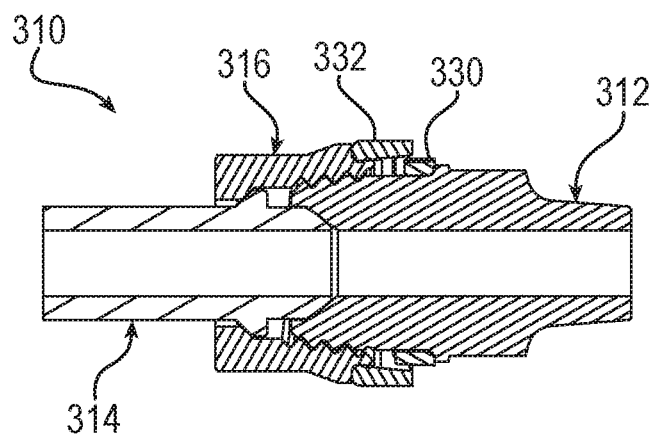
FIG. 29 is a cross-sectional view of the threaded coupling assembly according to the fourth embodiment shown in the exemplary fully assembled state.
Figure 30:
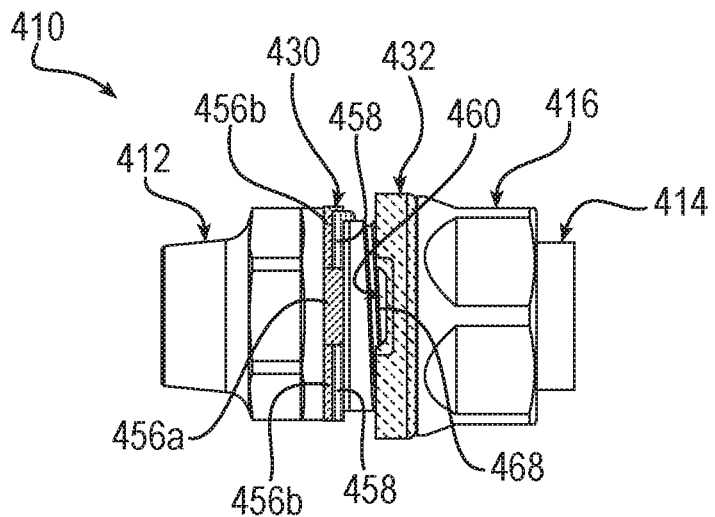
FIG. 30 is a front view of a threaded coupling assembly according to a fifth embodiment of the invention.
Figure 31:
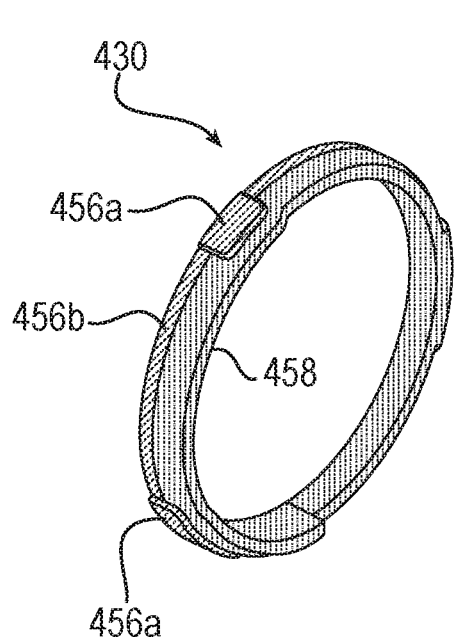
FIG. 31 is a bottom perspective view of an exemplary radially inner indicator ring according to the fifth embodiment.
Figure 32:
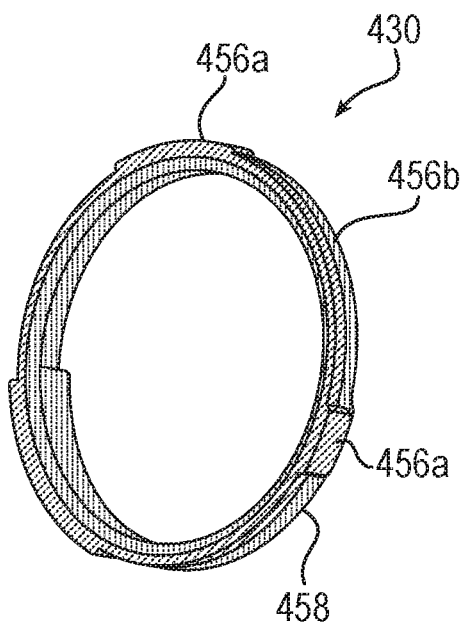
FIG. 32 is a top perspective view of the exemplary radially inner indicator ring according to the fifth embodiment.

Similarly to the coupling assembly 10, the threaded coupling assembly 310 is configured such that the first visual characteristic 356 of the inner ring 330 is aligned with and viewable through the window 360 of the outer ring 332 when the threaded coupling assembly is in the fully assembled state (as shown in FIG. 28, for example). Likewise, the first visual characteristic 356 of the inner ring 330 is out of alignment with the window 360 when the coupling assembly 310 is not in the fully assembled state (not shown). In the incomplete state (not shown), the second visual characteristic 358 of the inner ring 330 may align with and/or be viewed through the window 360 to provide contrasting visual effect between the second visual characteristic 358 and the third visual characteristic 368 at least partially encompassing the window 360, thereby providing an indication of incompleteness of the connection.

Turning to FIGS. 30-33C, another exemplary embodiment of a threaded coupling assembly 410 is shown. The coupling assembly 410 is substantially the same as the above-referenced coupling assembly 10, and consequently the same reference numerals but indexed by 400 are used to denote structures corresponding to the same or similar structures in the coupling assemblies 10, 410. In addition, the foregoing description of the coupling assemblies 10, 110, 210, 310 are equally applicable to the coupling assembly 410 except as noted below. Moreover, it is understood that aspects of the coupling assemblies 10, 110, 210, 310, 410 may be substituted for one another or used in conjunction with one another where applicable.

Similarly to the coupling assembly 10, the coupling assembly 410 generally includes a union 412, a tube end 414, and a coupling nut 416. The coupling assembly 410, however, has a different configuration for the first and second visual characteristics 456, 458 of the inner indicator ring 430.

The coupling assembly 410 includes radially inner indicator ring 430 and radially outer indicator ring 432 connected to the union 412 and the coupling nut 416, and which are configured substantially similar to the indicator rings 30, 32 described above. As such, the radially outer surface of the radially inner ring 430 has over at least a first arcuate portion thereof a first visual characteristic 456 (e.g., color, such as yellow or green) contrasting with a second visual characteristic 458 (e.g., color, such as red) that extends over a second arcuate portion of the radially outer surface of the radially inner ring 430. In the illustrated embodiment, the first and second visual characteristics 456, 458 are circumferentially offset relative to each other along at least an axial portion of the radially outer surface of the inner ring 430. The respective first and second visual characteristics 456, 458 are also axially offset relative to each other along at least a circumferential portion of the radially outer surface of the inner ring 430.

Figure 33C:
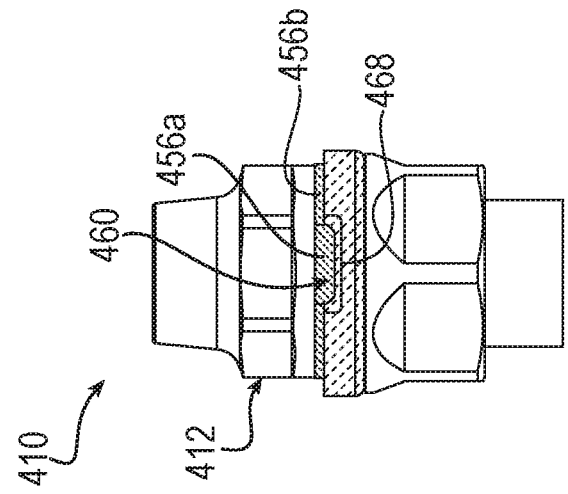
FIG. 33C is a front view of the threaded coupling assembly according to the fifth embodiment shown in an exemplary fully assembled state.

More particularly, the first visual characteristic 456 is provided both as an axial band 456a at the first arcuate portion of the inner ring 430, and also as a circumferential band 456b around an axially rearward portion of the inner ring 430. The second visual characteristic 458 on the other hand, is provided as a circumferential band axially forward of the first visual characteristic circumferential band 456b. In this manner, during the assembly process (shown in FIGS. 33A-C, for example), the outer ring 432 progressively reduces the visible portion of the inner ring 430, such that the first visual characteristic circumferential band 456b may be utilized as further indication of a complete connection when the second visual characteristic 458 (e.g., axially forward circumferential band) is obscured from view (as shown in FIG. 33C, for example). In some embodiments, the axial band 456a may be visually contrasting with the circumferential band 456b of the inner ring 430 (e.g., a different color), which could provide a four-component visually contrasting approach.

Similarly to the coupling assembly 10, the radially outer ring 432 has a third visual characteristic 468 that extends over at least a third arcuate portion of a radially outer surface of the radially outer ring 432, in which this third visual characteristic 368 (e.g., color, such as black or blue) may contrast with the second visual characteristic 458 (e.g., color, such as red) of the radially inner ring 430. The outer ring 432 has at least one circumferentially extending window 460 that is at least partially encompassed by the third visual characteristic 468, such as having the outer ring 432 as a single color, for example.

Similarly to the coupling assembly 10, the threaded coupling assembly 410 is configured such that the first visual characteristic 456 of the inner ring 330 is aligned with and viewable through the window 460 of the outer ring 432 when the threaded coupling assembly is in the fully assembled state (as shown in FIG. 33C, for example). As shown, the first visual characteristic axial band 456a is aligned with and viewable through the window 460. In other embodiments, however, the first visual characteristic may be provided only with the first visual characteristic circumferential band 456b, in which the advancement of the outer ring 432 over the inner ring 430 would cause alignment of this first visual characteristic band 456b to fill the window 460 indicating a complete connection, whereas the axially offset second visual characteristic 458 would indicate incomplete connection if viewable through the window 460.

Figure 33B:
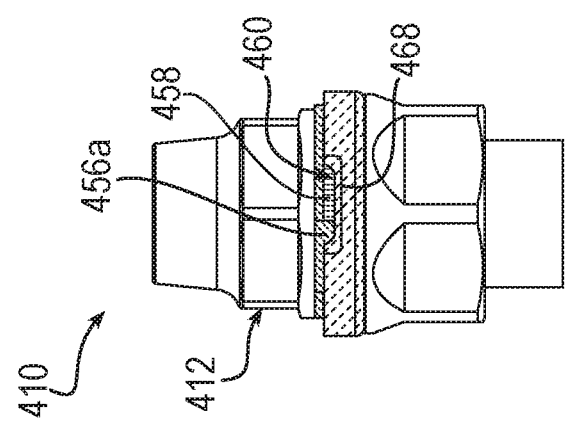
FIG. 33B is a front view of the threaded coupling assembly according to the fifth embodiment shown in an exemplary second partially assembled state.
Figure 33A:
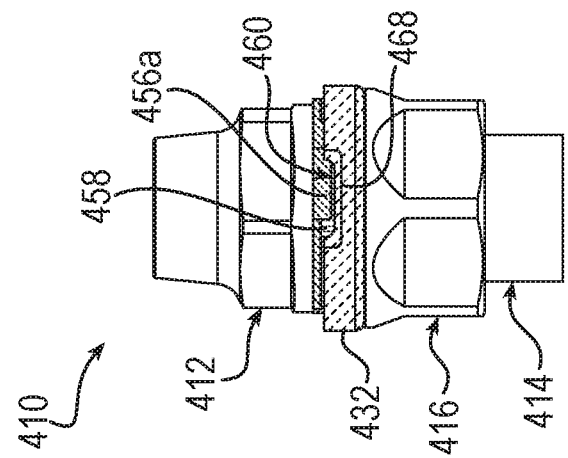
FIG. 33A is a front view of the threaded coupling assembly according to the fifth embodiment shown in an exemplary first partially assembled state.

As shown in FIGS. 33A and 33B, the first visual characteristic 456 (e.g., axial band 456a) of the inner ring 430 is out of alignment with the window 460 when the coupling assembly 410 is not in the fully assembled state. FIG. 33A illustrates an initial (e.g. hand-tight) partially assembled state. FIG. 33B illustrates an intermediate partially assembled state. In the incomplete states shown in FIGS. 33A and 33B, the second visual characteristic 458 of the inner ring 430 is viewable through the window 460 to provide contrasting visual effect between the second visual characteristic 458 and the third visual characteristic 468 at least partially encompassing the window 460, thereby providing an indication of incompleteness of the connection.

Figure 34:
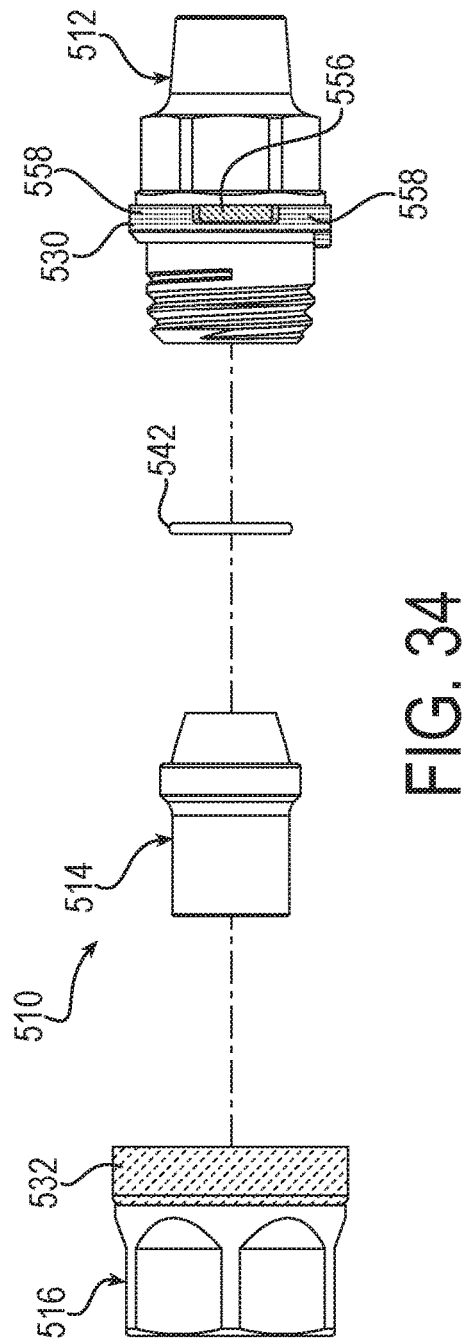
FIG. 34 is an exploded front view of an exemplary threaded coupling assembly according to a sixth embodiment of the invention.
Figure 36:
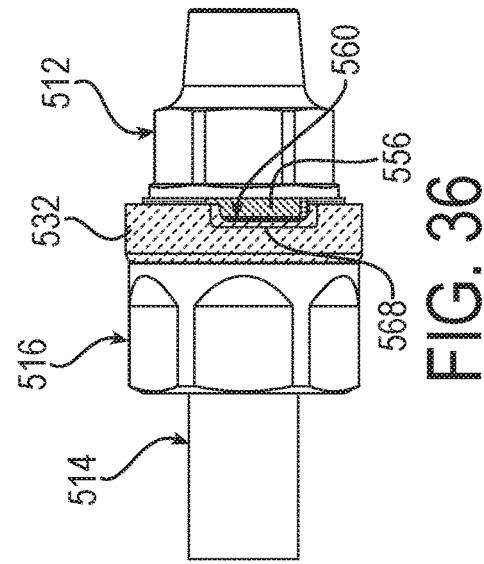
FIG. 36 is a front view of the threaded coupling assembly according to the sixth embodiment shown in an exemplary fully assembled state.
Figure 35:
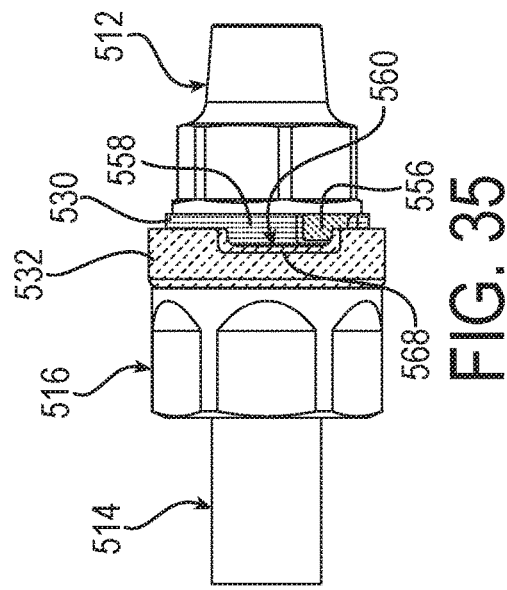
FIG. 35 is a front view of the threaded coupling assembly according to the sixth embodiment shown in an exemplary partially assembled state.

Turning to FIGS. 34-36, another exemplary embodiment of a threaded coupling assembly 510 is shown. The coupling assembly 510 is substantially the same as the above-referenced coupling assembly 10, and consequently the same reference numerals but indexed by 500 are used to denote structures corresponding to the same or similar structures in the coupling assemblies 10, 510. In addition, the foregoing description of the coupling assemblies 10, 110, 210, 310, 410 are equally applicable to the coupling assembly 510 except as noted below. Moreover, it is understood that aspects of the coupling assemblies 10, 110, 210, 310, 410, 510 may be substituted for one another or used in conjunction with one another where applicable.

Similarly to the coupling assembly 10, the coupling assembly 510 generally includes a union 512, a tube end 514, and a coupling nut 516. The coupling assembly 510, however, has a different configuration for the first and second visual characteristics 556, 558 of the inner indicator ring 530.

The coupling assembly 510 includes radially inner indicator ring 530 and radially outer indicator ring 532 connected to the union 512 and the coupling nut 516, and which are configured substantially similar to the indicator rings 30, 32 described above. As such, the radially outer surface of the radially inner ring 530 has over at least a first arcuate portion thereof a first visual characteristic 556 contrasting with a second visual characteristic 558 that extends over a second arcuate portion of the radially outer surface of the radially inner ring 530. In the illustrated embodiment, the first visual characteristic 556 is a window 556, having a similar configuration as window 560 of the outer ring 532, in which the underlying radially outer surface of the union 512 is viewable through this window 560. The second visual characteristic 558 is the color (e.g., red) of the inner ring 530, which may be a single color.

As shown, the radially outer ring 532 has a third visual characteristic 568 that extends over at least a third arcuate portion of a radially outer surface of the radially outer ring 532, in which this third visual characteristic 568 (e.g., color, such as black or blue) may contrast with the second visual characteristic 558 (e.g., color, such as red) of the radially inner ring 530. The outer ring 532 has at least one circumferentially extending window 560 that is at least partially encompassed by the third visual characteristic 568, such as having the outer ring 532 as a single color, for example.

Similarly to the coupling assembly 10, the threaded coupling assembly 510 is configured such that the first visual characteristic 556 of the inner ring 530 (e.g., window 556 with viewable underbody) is aligned with and viewable through the window 560 of the outer ring 532 when the threaded coupling assembly is in the fully assembled state (as shown in FIG. 36, for example). On the other hand, in the incomplete states shown in FIG. 35, first visual characteristic 556 (e.g., window 556) is out of alignment with the window 560. In this incomplete state (FIG. 35), the second visual characteristic 558 of the inner ring 530 (e.g., color of the inner ring 530) is viewable through the window 560 to provide contrasting visual effect between the second visual characteristic 558 and the third visual characteristic 568 at least partially encompassing the window 560, thereby providing an indication of incompleteness of the connection.

Exemplary threaded coupling assemblies have been described herein. The coupling assemblies generally include a union, a tube end, and a coupling nut. The union has a fluid passage, an external thread, and a receptacle. The tube end is receivable in the receptacle of the union and has an internal passage for communicating with the fluid passage of the union. The nut is engageable with a radially outwardly protruding shoulder on the tube end, and has an internal thread for engaging the external thread of the union for securing the tube end to the union. A pair of telescoping indicator rings are respectively connected to the union and the coupling nut, including a radially outer ring and a radially inner ring. The inner ring has a first visual characteristic contrasting with a second visual characteristic of the inner ring. The outer ring has a third visual characteristic contrasting with the second visual characteristic of the inner ring. The first visual characteristic of the inner ring is aligned with and viewable through the window of the outer ring when the threaded coupling assembly is in the fully assembled state, and the first visual characteristic is out of alignment with the window when the threaded coupling assembly is not in the fully assembled state. The assembly may utilize tapered threads and have one or more features that enhance self-alignment and/or sealability of the connection.

In exemplary embodiments, the threaded coupling assembly is provided with design features to self-align and minimize flow disruption through the connection point. These features may be combined with other design features for ease of assembly (e.g. tapered thread), assurance of proper assembly (e.g. visual indication), and redundant sealing (e.g. soft seal and metal-to-metal seal).

By incorporating a tapered thread, the risk of cross threading is significantly minimized, and the assembly angle during the connection also is significantly minimized, thereby providing a much faster and easier connection to assemble.

The design may incorporate redundant seals, including a resilient seal or O-ring installed in the union which is compressed during assembly for sealing, and the metal-to-metal seal between the tube end and the inset sealing cone in the union receptacle. The result is a more reliable connection with improved ease of assembly.

In some applications, tubing materials and geometries do not permit forming of a tube end from the major portion of the tube that conveys the fluid. As a result, the tube end may be a machined component, such as a sleeve, to permit offering the technological benefits (e.g. tapered thread, visual indication, redundant seals, self-alignment) to such applications. The sleeve may be attached to tubing in a variety of ways. This includes, but is not limited to, welding, brazing, internal swaging—roller or elastomeric, and external swaging—radial or axial. The sleeve may comprise a portion of the end fitting of a hose assembly.

The design of the tube end sealing interface may include a conical geometry of at least one angle for sealing against the internal cone of the union receptacle. Behind the conical sealing interface of the tube end is a shoulder of larger diameter which serves at least two functions. First, the shoulder is engaged by the nut to drive the tube end forward into the union sealing cone for sealing. Second, this shoulder is positioned relative to at least three features (the cone of the tube end, the cone of the union, and the front transverse face of the union) so as to achieve contact prior to completing the assembly operation. In this manner, any misalignment in the joint is corrected by a type of lever effect at the contact point between the shoulder and front transverse face of the union.

In alternate designs, the tube end sealing interface may be spherical instead of conical. This spherical interface provides for a more reliable seal, even under conditions of misalignment. As above, the shoulder on the tube end may be defined relative to the same three features (the tube end spherical "nose", the sealing cone of the union, and the front transverse face of the union) to provide for the self-aligning function. In other embodiments, other standard sealing interfaces (beam seal, flared, flareless, ball nose, etc.) may be used for the forward nose portion and complimentary shaped receptacle of the union instead. In any of the embodiments, the sealing cone of the union may be recessed from the front transverse face of the union, with corresponding features on the sleeve, either to minimize the total connection envelope dimensions, provide additional self-aligning features, or both.

The tube end internal profile also may be designed to avoid disruption of fluid conveyance through the inner passage, both by matching the inner diameter of the mating union and by providing smooth transitions into the point of attachment.

One or more of the foregoing features may be combined, such as with the tapered thread, visual indication, and (optionally) the redundant seals to provide a fast, easy, and reliable connection which self-aligns against misalignment and is minimally disruptive for fluid conveyance.

It is understood that the foregoing is exemplary, and alternative embodiments may include one or more of the following: (1) inverting the sleeve/union pattern (e.g. conical sleeve, spherical union); (2) using a two-angle cone on the union and a single angle sleeve; (3) provide a non-vertical/non-planar shoulder on the sleeve and transverse face of the union (for example, a ball/socket type joint, or having a "V" type corner shape and its complement); (4) inclusion of two or more seals, including O-ring type grooves or alternate designs such as face seals and/or metallic seals; and (5) using a one ring system, either with or without other markings directly on one half of the connection (e.g. nut or body).

The exemplary coupling assembly also makes further improvements on the visual indication system. In some applications, the use of only two colors for visual indication limits the visibility under low light conditions, has limited viewing angle, and/or is difficult for installer visual impairment (e.g. color blindness). It is also may be preferred that the indication call attention to improper assembly so that proper steps can be taken.

In exemplary embodiments, the coupling assembly enhances the visual indication functionality by providing a three-component visual contrasting approach. In particular, in exemplary embodiments the visual characteristic (e.g., color) of the outer ring is contrasted with at least the second visual characteristic (e.g., color) of the inner ring indicating an incomplete connection. The first visual characteristic of the inner ring also may contrast with both the second and third visual characteristics. The visual indicator system may provide full-circumference indication of complete assembly by having multiple arcuate segments with the foregoing first, second and third visual characteristics.

In exemplary embodiments, proper assembly is indicated by both angular position as well as lateral position of the two rings. For example, a window on the outer ring and corresponding contrasting colored indicators on the inner ring may be used to indicate proper angular position. A contrasting colored band on the inner ring also may be used to indicate proper axial position as it is obscured by the outer ring upon proper assembly.

In exemplary embodiments, the outer ring is a single color (e.g., black) and contains several windows along its forward edge. The inner ring also may have two contrasting colors (e.g., red and yellow). When the coupling assembly is properly assembled, the window of the outer ring aligns with one of the visual characteristics on the inner ring. When the coupling assembly is not fully assembled, or improperly assembled, the other (e.g., contrasting) color of the inner ring is visible through the window of the outer ring, indicating incomplete assembly. The inner ring also may contain a colored band contrasting with the color of the outer ring, which extends around the circumference of the inner ring. As the coupling assembly is fully assembled, the contrasting colored band may be obscured by the outer ring, thereby serves as an additional indicator that the fitting may or may not be properly assembled.

In alternative embodiments, the position of the indicator rings could be reversed, with additional contrasting highlights applied to both indicator rings. Additional shape profiles may be applied to the cutouts, such as triangular, circular, or angled.

In some embodiments, the first visual characteristic of the inner ring (e.g., indicating complete assembly) may be a window showing the underlying body (e.g., union or nut). The inner and outer rings may be designed and installed so that, at final assembly position, the corresponding windows on the inner and outer rings align and expose a third indication color, such as the surface of the union body or a mark with a third, distinct color on the inner ring. In this way, the proper, intended assembly position can be recognized by the fact that the complete inner ring is covered by the outer ring and is not visible anymore. This provides a three-color indication by using the surface color of the union body that is visible in the cutouts of the inner ring as a third color. This offers further clarity to the visual indication system by facilitating indication of improper assembly, especially in unfavorable light conditions. To help facilitating the indication, the colors are preferably chosen in a way to provide contrast in between each other and to the union body color, leading to a three color indication system which provides more clarity than only a two color indication. In alterative embodiments, the respective windows of the inner and outer rings may be designed in a way that the colored inner ring only fills the window of the outer ring in the fully assembled state.

According to an aspect of the invention, a threaded coupling assembly for interconnecting fluid-carrying conduit members, includes: a union having a fluid passage for passage of a fluid, an external thread, and a receptacle; a tube end receivable in the receptacle of the union and having an internal passage for communicating with the fluid passage of the union; a coupling nut axially engageable with a radially outwardly protruding shoulder on the tube end, the coupling nut being rotatable about the tube end and having an internal thread for engaging the external thread of the union for securing the tube end to the union, wherein rotation of the coupling nut relative to the union causes the tube end to be forcibly drawn into the union for effecting a seal between the union and the tube end; a pair of telescoping indicator rings respectively connected to the union and the coupling nut, the pair of telescoping indicator rings including a radially outer ring and a radially inner ring; wherein the radially outer surface of the radially inner ring has over at least a first arcuate portion thereof a first visual characteristic contrasting with a second visual characteristic that extends over a second arcuate portion of the radially outer surface of the radially inner ring; wherein the radially outer ring has a third visual characteristic that extends over at least a third arcuate portion of a radially outer surface of the radially outer ring, the third visual characteristic contrasting with the second visual characteristic of the radially inner ring; wherein the radially outer ring has at least one circumferentially extending window that is at least partially encompassed by the third visual characteristic; wherein the first visual characteristic and/or the second visual characteristic of the radially inner ring are viewable through the window of the radially outer ring during relative of rotation of the union and coupling nut from a partially assembled state to a fully assembled state; wherein the threaded coupling assembly is configured such that the first visual characteristic of the radially inner ring is aligned with and viewable through the window of the radially outer ring when the threaded coupling assembly is in the fully assembled state to effect the seal between the union and the tube end; and wherein the threaded coupling assembly is configured such that the first visual characteristic of the radially inner ring is out of alignment with the window of the radially outer ring when the threaded coupling assembly is not in the fully assembled state.

According to another aspect of the invention, a threaded coupling assembly for interconnecting fluid-carrying conduit members, includes: a union having a fluid passage for passage of a fluid, an external tapered thread, and a receptacle; a machined tube end receivable in the receptacle of the union and having an internal passage for communicating with the fluid passage of the union, the tube end having a machined axially forward nose portion having a radially outer sealing surface that is configured to engage a radially inner sealing surface of the receptacle of the union, and the tube end having a machined radially outwardly protruding shoulder that is axially rearward of the forward nose portion; a coupling nut axially engageable with the shoulder of the tube end, the coupling nut being rotatable about the tube end and having an internal tapered thread for engaging the external thread of the union for securing the tube end to the union, wherein rotation of the coupling nut relative to the union causes the tube end to be forcibly drawn into the union from a partially assembled state to a fully assembled state for effecting a seal between the radially outer sealing surface of the tube end and the radially inner sealing surface of the union; and a pair of telescoping indicator rings respectively connected to the union and the coupling nut, the pair of telescoping indicator rings including a radially outer ring and a radially inner ring, the radially outer ring having at least one circumferentially extending window through which an arcuate segment of the radially inner ring can be viewed during relative of rotation of the union and coupling nut from the partially assembled state to the fully assembled state, the radially outer surface of the radially inner ring having over at least a first arcuate portion thereof a first visual characteristic contrasting with a second visual characteristic that extends over a second arcuate portion of the radially outer surface of the radially inner ring; wherein the shoulder of the tube end has an axially forwardly facing mating surface that is configured to interface with a mating face of the union to provide self-alignment of the respective tapered threads when the threaded coupling assembly is in the partially assembled state; wherein the first visual characteristic of the radially inner ring is aligned with and viewable through the window of the radially outer ring when the threaded coupling assembly is in the fully assembled state to effect the seal between the union and the tube end; and wherein the first visual characteristic of the radially inner ring is out of alignment with the window of the radially outer ring when the threaded coupling assembly is not in the fully assembled state.

Embodiments of the invention may include one or more features of the foregoing aspects, separately or in any combination, which may be combined with one or more of the following additional features, which may be included separately or in any combination.

In some embodiments, the threaded coupling assembly is configured such that the second visual characteristic of the radially inner ring is aligned with and/or viewable through the window of the radially outer ring to provide contrasting visual effect between the second visual characteristic and the third visual characteristic at least partially encompassing the window when the threaded coupling assembly is not in the fully assembled state.

In some embodiments, the second visual characteristic is circumferentially offset from the first visual characteristic.

In some embodiments, the radially inner ring includes a plurality of circumferentially spaced apart first visual characteristics.

In some embodiments, the radially inner ring includes a plurality of second visual characteristics interposed between the respective first visual characteristics.

In some embodiments, the radially outer ring includes a plurality of windows circumferentially spaced apart, each of the plurality of windows being at least partially encompassed by respective third visual characteristics.

In some embodiments, the second visual characteristic of the radially inner ring is axially offset from the first visual characteristic, the second visual characteristic being located axially forward of the first visual characteristic.

In some embodiments, the first visual characteristic of the radially inner ring matches with the third visual characteristic of the radially outer ring.

In some embodiments, the first visual characteristic of the radially inner ring contrasts with the third visual characteristic of the radially outer ring.

In some embodiments, the first visual characteristic, second visual characteristic, and third visual characteristics are colors.

In some embodiments, the first visual characteristic, second visual characteristic, and third visual characteristics are symbols, patterns, or shapes.

In some embodiments, the first visual characteristic is a window formed in the radially inner ring.

In some embodiments, the window of the radially outer ring is of fixed arcuate length.

In some embodiments, the window of the radially inner ring is of fixed arcuate length.

In some embodiments, the window of the radially outer ring has axially extending end portions that circumferentially bound the window.

In some embodiments, the third visual characteristic covers an entire arcuate portion over which the window extends.

In some embodiments, the window is trimmed with the third visual characteristic.

In some embodiments, the radially outer ring is discrete with respect to the nut or union and is frictionally attached to the nut or union, the radially outer ring having a stop that is configured to engage a stop of the radially inner ring when in the fully assembled state; and wherein the radially outer ring can be rotated relative to the nut or union of which it is frictionally attached when a predefined resistance to the frictional attachment has been overcome.

In some embodiments, the radially inner ring is discrete with respect to the nut or union and is frictionally attached to the nut or union, the radially outer ring having a stop that is configured to engage a stop of the radially inner ring when in the fully assembled state; and wherein the radially inner ring can be rotated relative to the nut or union of which it is frictionally attached when a predefined resistance to the frictional attachment has been overcome.

In some embodiments, the stop of the radially outer ring is a radially inwardly protruding abutment, and wherein the stop of the radially inner ring is an axially extending ridge.

In some embodiments, the threads of the nut and the threads of the union are each configured as tapered threads.

In some embodiments, the tube end has a forward nose portion that makes sealing engagement with the receptacle of the union, the forward nose portion having a radially outward surface in a configuration including: conical, multiply-tapered, or spherical.

In some embodiments, the tube end has a forward nose portion that makes sealing engagement with the receptacle of the union, the forward nose portion having an axially extending cylindrical surface that axially spaces a radially inwardly tapered surface from the shoulder, and wherein the receptacle is complimentarily configured with an axially extending annular internal surface that axially spaces an internal tapered surface from a front face of the union.

In some embodiments, the shoulder of the tube end has an axially forwardly facing mating surface that is configured to interface with a mating face of the union to provide self-alignment of the respective tapered threads when the threaded coupling assembly is in the partially assembled state.

In some embodiments, an internal diameter of the internal passage of the tube end matches with an internal diameter of the fluid passage of the union to mitigate flow disruptions.

In the discussion above, terms such as "top," "bottom," "upper," "lower," "left," "right," "front," "rear," "forward," "rearward," and the like should be understood as referring to an arbitrary frame of reference, rather than to the ordinary gravitational frame of reference.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A threaded coupling assembly for interconnecting fluid-carrying conduit members, comprising:
    a union having a fluid passage for passage of a fluid, an external thread, and a receptacle;
    a tube end receivable in the receptacle of the union and having an internal passage for communicating with the fluid passage of the union;
    a coupling nut axially engageable with a radially outwardly protruding shoulder on the tube end, the coupling nut being rotatable about the tube end and having an internal thread for engaging the external thread of the union for securing the tube end to the union, wherein rotation of the coupling nut relative to the union causes the tube end to be forcibly drawn into the union for effecting a seal between the union and the tube end;
    a pair of telescoping indicator rings respectively connected to the union and the coupling nut, the pair of telescoping indicator rings including a radially outer ring and a radially inner ring;
    wherein the radially outer surface of the radially inner ring has over at least a first arcuate portion thereof a first visual characteristic contrasting with a second visual characteristic that extends over a second arcuate portion of the radially outer surface of the radially inner ring;
    wherein the radially outer ring has a third visual characteristic that extends over at least a third arcuate portion of a radially outer surface of the radially outer ring, the third visual characteristic contrasting with the second visual characteristic of the radially inner ring;
    wherein the radially outer ring has at least one circumferentially extending window that is at least partially encompassed by the third visual characteristic;
    wherein the first visual characteristic and/or the second visual characteristic of the radially inner ring are viewable through the window of the radially outer ring during relative of rotation of the union and coupling nut from a partially assembled state to a fully assembled state;
    wherein the threaded coupling assembly is configured such that the first visual characteristic of the radially inner ring is circumferentially and axially aligned with and viewable through the window of the radially outer ring when the threaded coupling assembly is in the fully assembled state in which the seal is effected between the union and the tube end; and
    wherein the threaded coupling assembly is configured such that the first visual characteristic of the radially inner ring is out of circumferential and axial alignment with the window of the radially outer ring when the threaded coupling assembly is not in the fully assembled state.

2. The coupling assembly according to claim 1, wherein the threaded coupling assembly is configured such that the second visual characteristic of the radially inner ring is aligned with and/or viewable through the window of the radially outer ring to provide contrasting visual effect between the second visual characteristic and the third visual characteristic at least partially encompassing the window when the threaded coupling assembly is not in the fully assembled state.

3. The coupling assembly according to claim 1, wherein the second visual characteristic is circumferentially offset from the first visual characteristic.

4. The coupling assembly according to claim 3, wherein the radially inner ring includes a plurality of circumferentially spaced apart first visual characteristics,
    wherein the radially inner ring includes a plurality of second visual characteristics interposed between the respective first visual characteristics; and wherein the radially outer ring includes a plurality of windows circumferentially spaced apart, each of the plurality of windows being at least partially encompassed by respective third visual characteristics.

5. The coupling assembly according to claim 1, wherein the second visual characteristic of the radially inner ring is axially offset from the first visual characteristic, the second visual characteristic being located axially forward of the first visual characteristic.

6. The coupling assembly according to claim 1, wherein the first visual characteristic of the radially inner ring matches with the third visual characteristic of the radially outer ring.

7. The coupling assembly according to claim 1, wherein the first visual characteristic of the radially inner ring contrasts with the third visual characteristic of the radially outer ring.

8. The coupling assembly according to claim 1, wherein the first visual characteristic, second visual characteristic, and third visual characteristics are colors.

9. The coupling assembly according to claim 1, wherein the first visual characteristic is a window formed in the radially inner ring.

10. The coupling assembly according to claim 1, wherein the window of the radially outer ring is of fixed arcuate length.

11. The coupling assembly according to claim 10, wherein the window has axially extending end portions that circumferentially bound the window.

12. The coupling assembly according to claim 1, wherein the third visual characteristic covers an entire arcuate portion over which the window extends, or wherein the window is trimmed with the third visual characteristic.

13. The coupling assembly according to claim 1, wherein the radially outer ring is discrete with respect to the nut or union and is frictionally attached to the nut or union, the radially outer ring having a stop that is configured to engage a stop of the radially inner ring when in the fully assembled state; and wherein the radially outer ring can be rotated relative to the nut or union of which it is frictionally attached when a predefined resistance to the frictional attachment has been overcome; or wherein the radially inner ring is discrete with respect to the nut or union and is frictionally attached to the nut or union, the radially outer ring having a stop that is configured to engage a stop of the radially inner ring when in the fully assembled state; and wherein the radially inner ring can be rotated relative to the nut or union of which it is frictionally attached when a predefined resistance to the frictional attachment has been overcome.

14. The coupling assembly according to claim 13, wherein the stop of the radially outer ring is a radially inwardly protruding abutment, and wherein the stop of the radially inner ring is an axially extending ridge.

15. The coupling assembly according to claim 1, wherein the threads of the nut and the threads of the union are each configured as tapered threads.

16. The coupling assembly according to claim 1, wherein the tube end has a forward nose portion that makes sealing engagement with the receptacle of the union, the forward nose portion having a radially outward surface in a configuration including: conical, multiply-tapered, or spherical.

17. The coupling assembly according to claim 1, wherein the tube end has a forward nose portion that makes sealing engagement with the receptacle of the union, the forward nose portion having an axially extending cylindrical surface that axially spaces a radially inwardly tapered surface from the shoulder, and wherein the receptacle is complimentarily configured with an axially extending annular internal surface that axially spaces an internal tapered surface from a front face of the union.

18. The coupling assembly according to claim 1, wherein the shoulder of the tube end has an axially forwardly facing mating surface that is configured to interface with a mating face of the union to provide self-alignment of the respective tapered threads when the threaded coupling assembly is in the partially assembled state.

19. A threaded coupling assembly for interconnecting fluid-carrying conduit members, comprising a union having a fluid passage for passage of a fluid, an external tapered thread, and a receptacle;

a machined tube end receivable in the receptacle of the union and having an internal passage for communicating with the fluid passage of the union, the tube end having a machined axially forward nose portion having a radially outer sealing surface that is configured to engage a radially inner sealing surface of the receptacle of the union, and the tube end having a machined radially outwardly protruding shoulder that is axially rearward of the forward nose portion;

a coupling nut axially engageable with the shoulder of the tube end, the coupling nut being rotatable about the tube end and having an internal tapered thread for engaging the external thread of the union for securing the tube end to the union, wherein rotation of the coupling nut relative to the union causes the tube end to be forcibly drawn into the union from a partially assembled state to a fully assembled state for effecting a seal between the radially outer sealing surface of the tube end and the radially inner sealing surface of the union; and a pair of telescoping indicator rings respectively connected to the union and the coupling nut, the pair of telescoping indicator rings including a radially outer ring and a radially inner ring, the radially outer ring having at least one circumferentially extending window through which an arcuate segment of the radially inner ring can be viewed during relative of rotation of the union and coupling nut from the partially assembled state to the fully assembled state, the radially outer surface of the radially inner ring having over at least a first arcuate portion thereof a first visual characteristic contrasting with a second visual characteristic that extends over a second arcuate portion of the radially outer surface of the radially inner ring;

wherein the shoulder of the tube end has an axially forwardly facing mating surface that is configured to interface with a mating face of the union to provide self-alignment of the respective tapered threads when the threaded coupling assembly is in the partially assembled state;

wherein the first visual characteristic of the radially inner ring is circumferentially and axially aligned with and viewable through the window of the radially outer ring when the threaded coupling assembly is in the fully assembled state in which the seal is effected between the union and the tube end; and wherein the first visual characteristic of the radially inner ring is out of circumferential and axial alignment with the window of the radially outer ring when the threaded coupling assembly is not in the fully assembled state.

* * * * *